US010518628B2

(12) United States Patent
Ammar

(10) Patent No.: US 10,518,628 B2
(45) Date of Patent: Dec. 31, 2019

(54) APPARATUS AND METHODS FOR A SPHERICAL ASSEMBLY

(71) Applicant: Essam Abdelrahman Ammar, Chicago, IL (US)

(72) Inventor: Essam Abdelrahman Ammar, Chicago, IL (US)

( * ) Notice: Subject to any disclaimer, the term of this patent is extended or adjusted under 35 U.S.C. 154(b) by 0 days.

(21) Appl. No.: 16/413,015

(22) Filed: May 15, 2019

(65) Prior Publication Data

US 2019/0275879 A1      Sep. 12, 2019

Related U.S. Application Data

(63) Continuation-in-part of application No. 15/916,564, filed on Mar. 9, 2018, now Pat. No. 10,315,460.

(51) Int. Cl.
*B60K 7/00* (2006.01)
*B60B 19/00* (2006.01)
*B60B 19/14* (2006.01)

(52) U.S. Cl.
CPC .......... *B60K 7/0007* (2013.01); *B60B 19/003* (2013.01); *B60B 19/14* (2013.01); *B60K 2007/003* (2013.01)

(58) Field of Classification Search
CPC ..... B60B 19/003; B60B 19/006; B60B 19/14; B60K 2007/003; B60K 7/00; B60L 13/04; B60L 13/10
See application file for complete search history.

(56) References Cited

U.S. PATENT DOCUMENTS

| | | | |
|---|---|---|---|
| 19,183 A | 1/1858 | Bussell |
| 45,530 A | 12/1864 | Smith |
| 99,369 A | 2/1870 | Stivender |
| 121,125 A | 11/1871 | Patric |
| 140,132 A | 6/1873 | Gibbons |
| 177,817 A | 5/1876 | Dimock |
| 209,042 A | 10/1878 | Hanscom |
| 223,418 A | 1/1880 | Ware |
| 262,693 A | 8/1882 | Roberts |
| 265,186 A | 9/1882 | Tomlinson |
| 272,012 A | 2/1883 | Zinsmaier et al. |
| 301,420 A | 7/1884 | Zinsmaier et al. |
| 304,072 A | 8/1884 | Buell |
| 308,218 A | 11/1884 | Vogel |
| 347,710 A | 8/1886 | Houlehan |

(Continued)

*Primary Examiner* — Kip T Kotter
(74) *Attorney, Agent, or Firm* — Duane Morris LLP

(57) ABSTRACT

A propulsion apparatus and corresponding methods are provided. The apparatus employs weights within a spherical assembly that can rotate within the spherical assembly. Gravity, acting on the weights, causes a moment of a gravitational force to be applied to the spherical assembly, which can cause the spherical assembly to propel. The spherical assembly may also include one or more motors to rotate the weights within the spherical assembly. In some embodiments, the weights include magnetic cores and conductors. The apparatus can include magnetic windings that provide a magnetic flux through which the weights may rotate. The apparatus can also provide an electrical current to the conductors. As the weights with the magnetic cores rotate through the magnetic flux, the apparatus applies a current to the conductors. As such, a magnetic force is applied to the weights, which can propel the spherical assembly.

20 Claims, 17 Drawing Sheets

(56) References Cited

U.S. PATENT DOCUMENTS

| | | |
|---|---|---|
| 353,717 A | 12/1886 | Spencer |
| 368,570 A | 8/1887 | Close |
| 391,886 A | 10/1888 | Emery |
| 398,440 A | 2/1889 | Huckabay |
| 408,525 A | 8/1889 | Ringen |
| 418,590 A | 12/1889 | Ringen |
| 425,327 A | 4/1890 | Johnson |
| 438,552 A | 10/1890 | Layman et al. |
| 450,927 A | 4/1891 | Chatard |
| 454,821 A | 6/1891 | Holland |
| 456,535 A | 7/1891 | Burt |
| 475,580 A | 5/1892 | Lewis |
| 518,371 A | 4/1894 | Leverkus |
| 549,741 A | 11/1895 | Parsons |
| 554,950 A | 2/1896 | Hendryx |
| 560,222 A | 5/1896 | Levings |
| 561,998 A | 6/1896 | Knobloch |
| 573,583 A | 12/1896 | Ericsson |
| 576,830 A | 2/1897 | Ulli |
| 599,129 A | 2/1898 | Hollingsworth et al. |
| 634,912 A | 10/1899 | Richardson et al. |
| 651,594 A | 6/1900 | Cordry |
| 659,660 A | 10/1900 | Gehre |
| 675,497 A | 6/1901 | Pollock |
| 680,038 A | 8/1901 | Gore |
| 685,269 A | 10/1901 | Fulton |
| 689,311 A | 12/1901 | Karross |
| 702,521 A | 6/1902 | Woods |
| 705,047 A | 7/1902 | Deis |
| 705,700 A | 7/1902 | Osterud |
| 707,377 A | 8/1902 | Bell |
| 717,730 A | 1/1903 | Windsor |
| 767,119 A | 8/1904 | Porter |
| 771,665 A | 10/1904 | Porter |
| 798,915 A | 9/1905 | Miller |
| 803,832 A | 11/1905 | Laird |
| 822,067 A | 5/1906 | Mowen |
| 822,203 A | 5/1906 | Fleming |
| 827,218 A | 7/1906 | De Vos |
| 838,577 A | 12/1906 | Oliver |
| 870,965 A | 11/1907 | Hutchings |
| 971,482 A | 9/1910 | Anthony |
| 994,101 A | 5/1911 | Andres |
| 999,562 A | 8/1911 | Hoeschen |
| 1,037,643 A | 9/1912 | Kuhn |
| 1,083,794 A | 1/1914 | Braunsdorf |
| 1,097,360 A | 5/1914 | Perry |
| 1,136,911 A | 4/1915 | Kiger |
| 1,166,473 A | 1/1916 | Nicholson |
| 1,194,928 A | 8/1916 | Auer |
| 1,198,735 A | 9/1916 | Lux |
| 1,219,749 A | 3/1917 | Korfhage |
| 1,258,909 A | 3/1918 | King |
| 1,261,969 A | 4/1918 | Taliaferro |
| 1,352,936 A | 9/1920 | Barrett |
| 1,357,994 A | 11/1920 | Kepner |
| 1,366,508 A | 1/1921 | Taliaferro |
| 1,391,817 A | 9/1921 | Atherton |
| 1,495,698 A | 5/1924 | Kramer et al. |
| 1,565,031 A | 12/1925 | Strout |
| 1,565,705 A | 12/1925 | Boner |
| 1,568,015 A | 12/1925 | Williams et al. |
| 1,800,486 A | 4/1931 | Tokumi |
| 1,815,729 A | 7/1931 | Armstrong et al. |
| 1,818,613 A | 8/1931 | Gillette |
| 1,853,637 A | 4/1932 | Reiner |
| 1,952,030 A | 3/1934 | Korfhage |
| 2,276,410 A | 3/1942 | Meletti |
| 2,340,155 A | 1/1944 | Tanner |
| 2,422,753 A | 6/1947 | Sowerwine |
| 2,526,817 A | 10/1950 | Harness |
| 3,261,160 A | 7/1966 | Hart |
| 3,271,959 A | 9/1966 | Van Gils |
| 3,421,479 A | 1/1969 | Fleming |
| 4,201,059 A | 5/1980 | Feder |
| 4,302,903 A | 12/1981 | Pun |
| 4,333,548 A | 6/1982 | Jones |
| 4,492,287 A | 1/1985 | Umehara |
| 4,587,084 A | 5/1986 | Hawke |
| 4,848,134 A | 7/1989 | Elkins |
| 5,146,798 A | 9/1992 | Anderson |
| 5,533,214 A | 7/1996 | Graham |
| 5,890,240 A | 4/1999 | Graham |
| 5,992,252 A | 11/1999 | Krajec |
| 6,386,322 B1 | 5/2002 | McCormick |
| 6,422,347 B1 | 7/2002 | Kime |
| 7,406,887 B2 | 8/2008 | Jensen |
| 7,644,805 B2 | 1/2010 | Chiu |
| 7,765,804 B2 | 8/2010 | Davis |
| 8,459,383 B1 | 6/2013 | Burget |
| 2015/0123451 A1* | 5/2015 | Nelson .................. B60B 19/003 |
| | | 301/6.5 |
| 2018/0251040 A1* | 9/2018 | Fontaine .................. B60L 13/10 |
| 2019/0097513 A1* | 3/2019 | Kim ....................... H02K 41/03 |

* cited by examiner

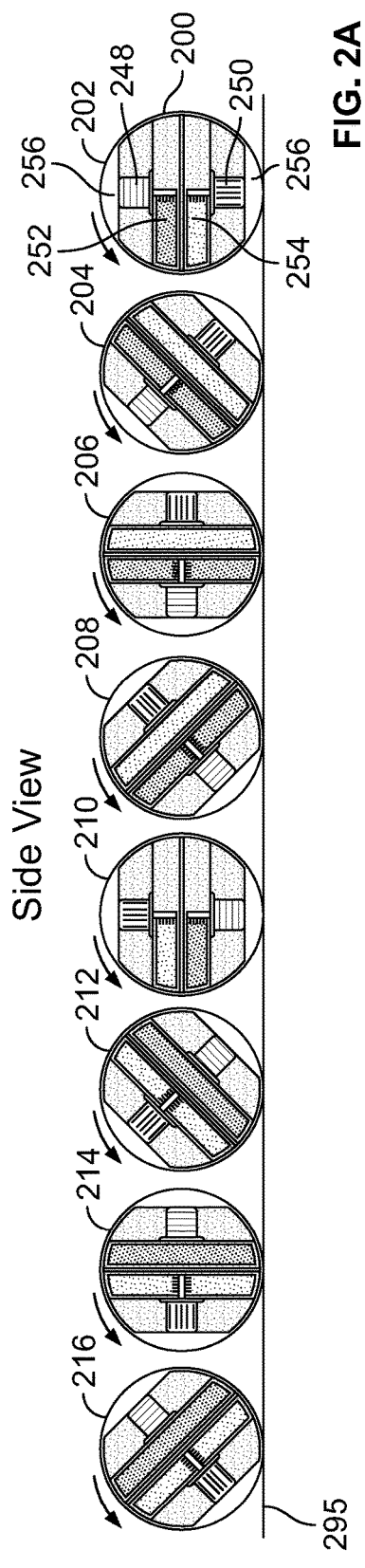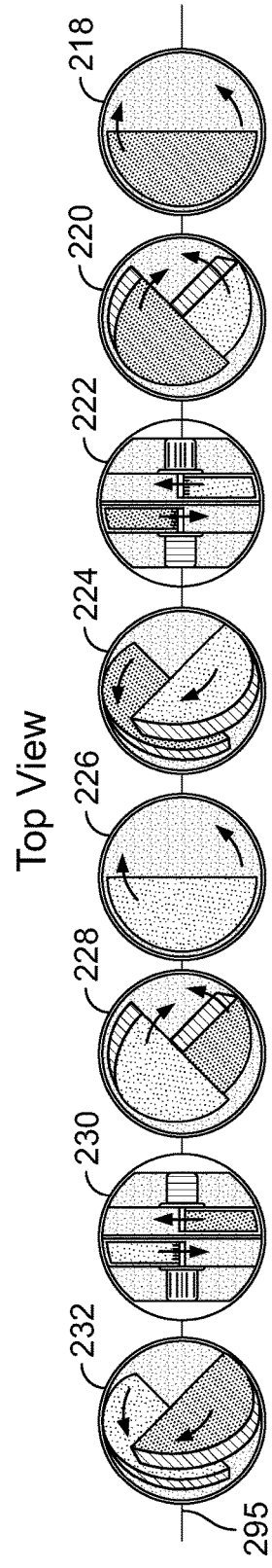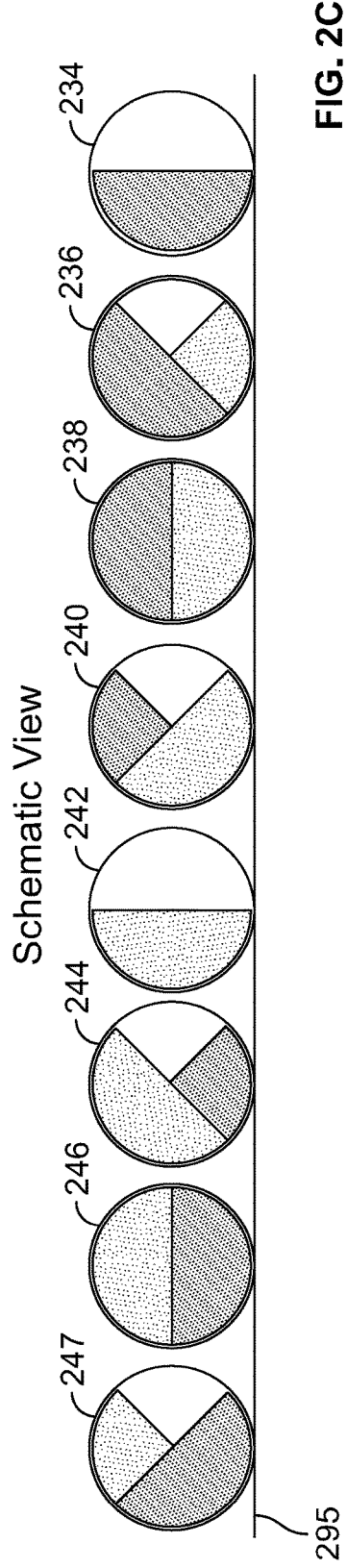

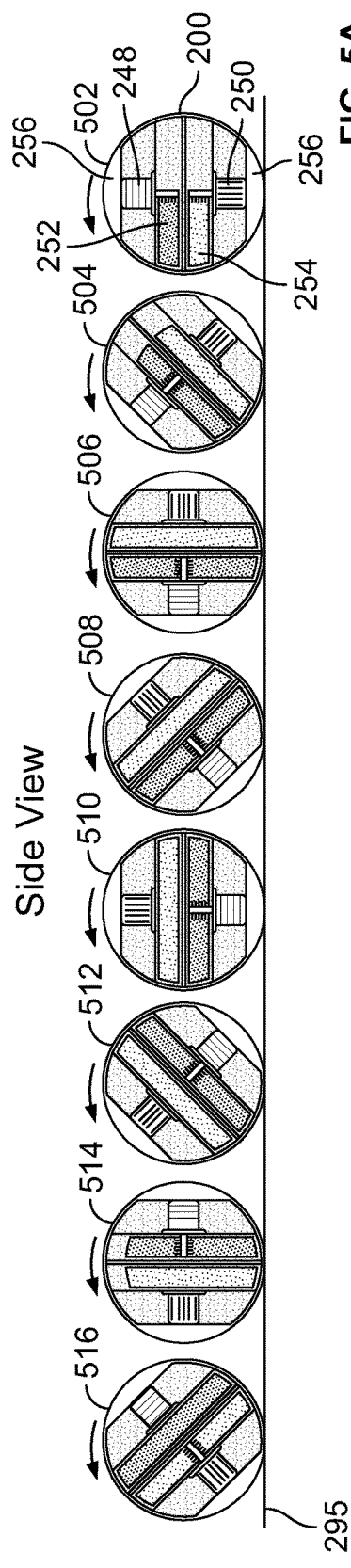
FIG. 5A Side View
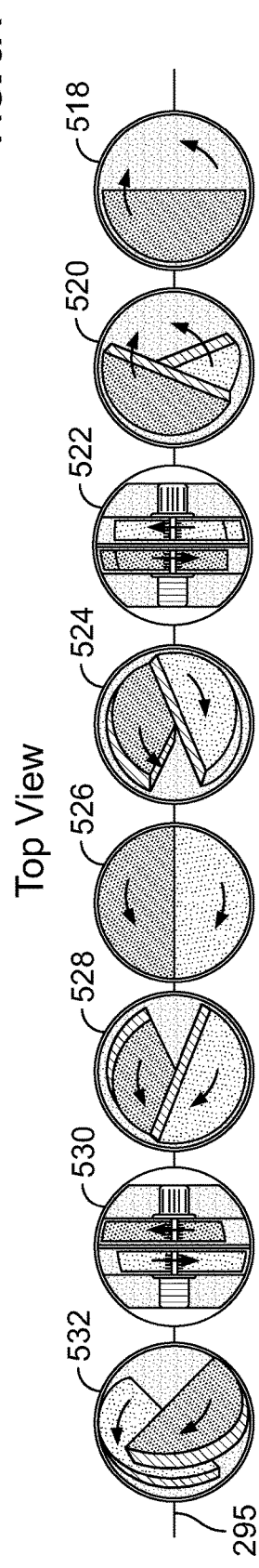
FIG. 5B Top View
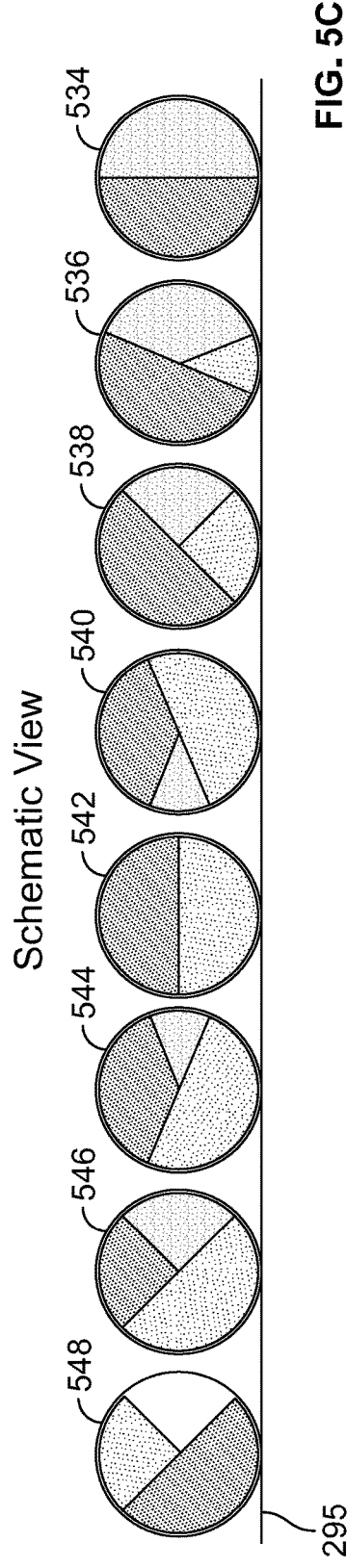
FIG. 5C Schematic View

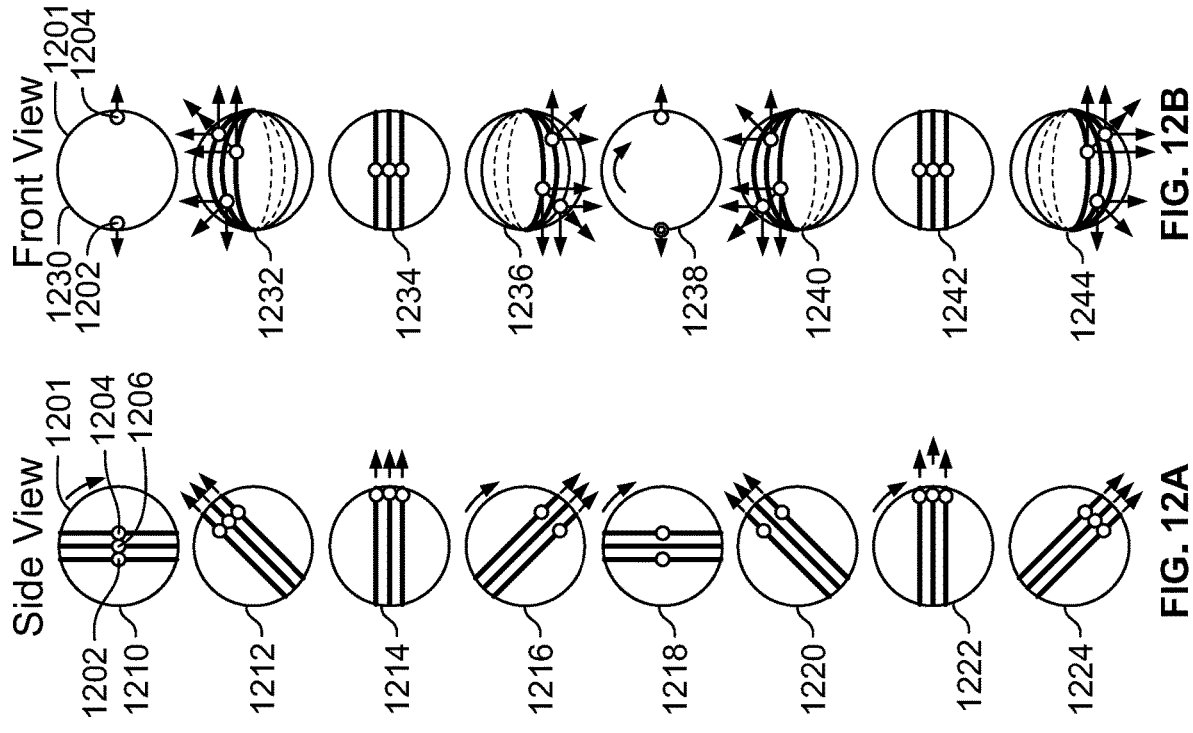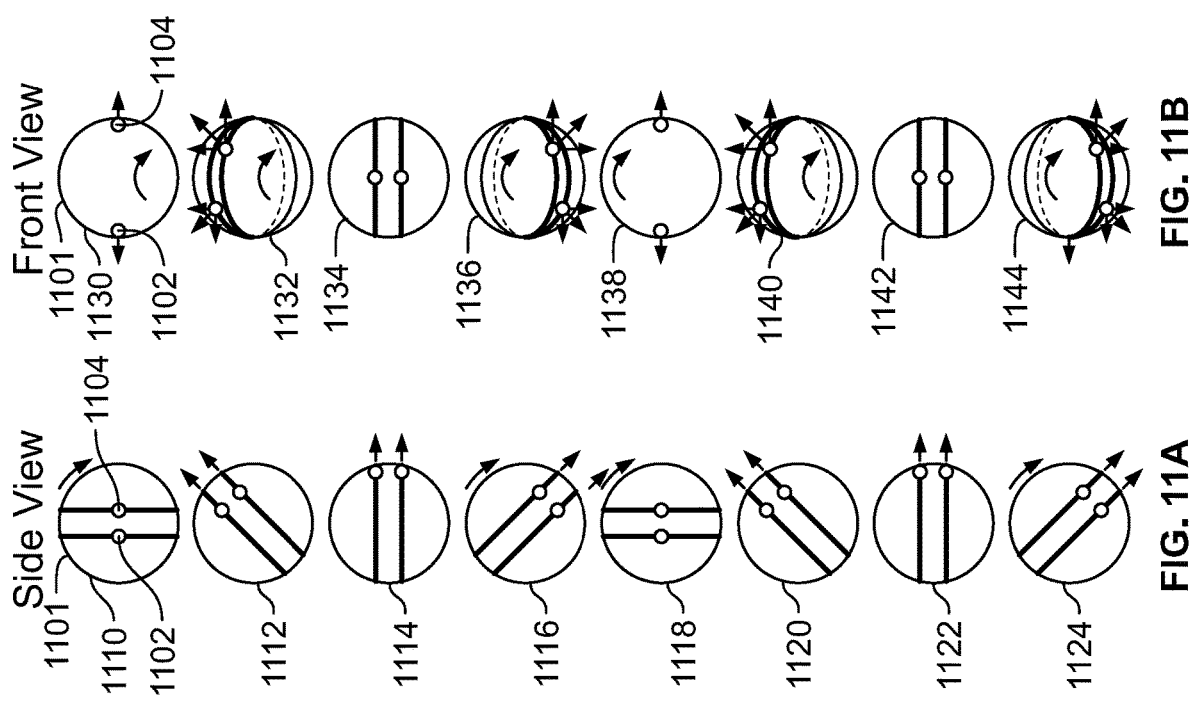

Side View

Top View

Side View

Front View

Front View
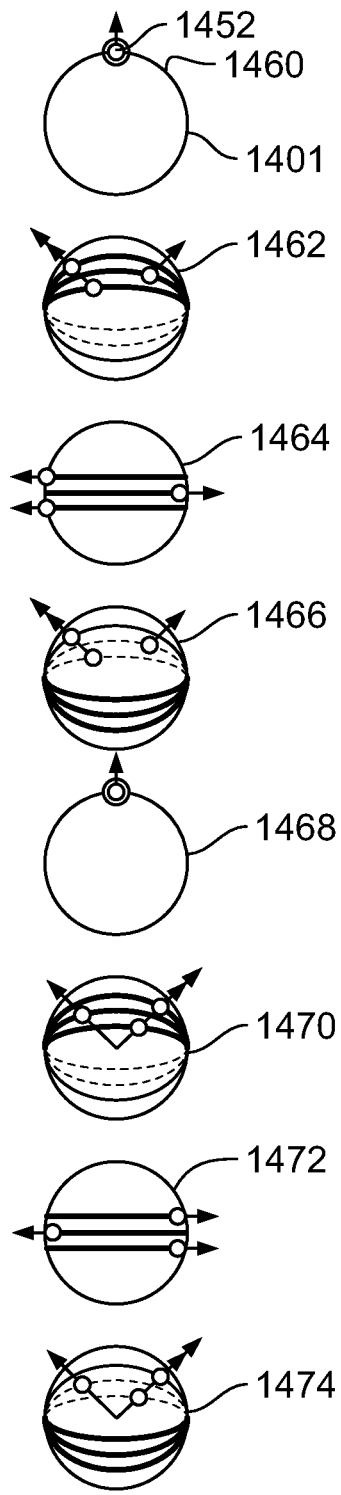
Side View
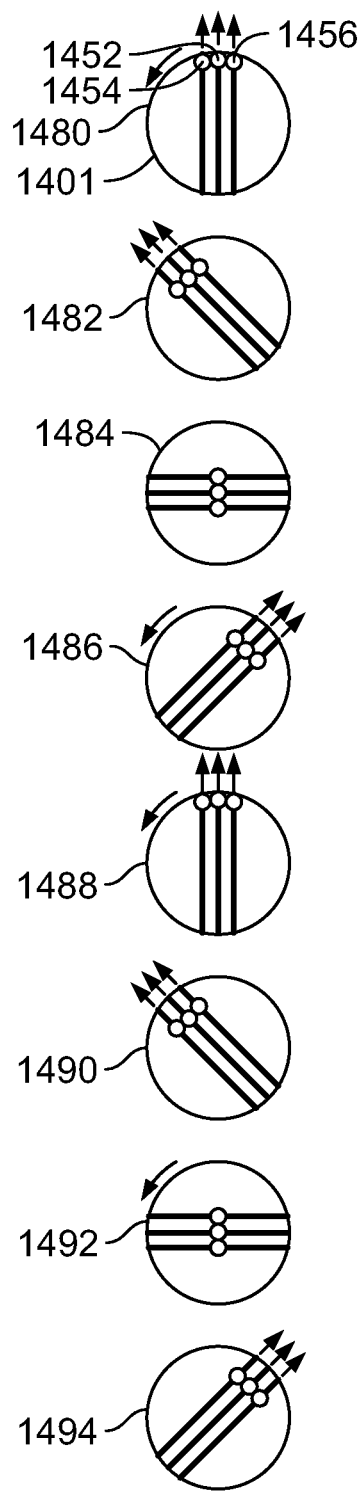
FIG. 14E
FIG. 14F

APPARATUS AND METHODS FOR A SPHERICAL ASSEMBLY

FIELD

This disclosure relates generally to propulsion and, more specifically, vehicle drive systems and corresponding methods of propulsion.

BACKGROUND

Today's transport vehicles include vehicle drive systems that are powered typically by either internal combustion engines, electric motors, or, in some cases, a hybrid of both, which provide power for vehicle propulsion. These vehicles are also equipped with steering mechanisms and manually or automatically controlled gearboxes. These steering mechanisms allow for the control of vehicle travel direction, while the gearboxes facilitate vehicle torque and speed. To change travel direction, however, the vehicles require a circular area in which to execute the turn, also known as a turning radius.

To propel in a given direction, today's vehicles depend on the horizontal reacting force of friction between the vehicle's tires and the surface of travel (e.g., the road). The force of friction is based on a coefficient of friction and the vertical force of the vehicle's weight at the point of contact between the vehicle's tires and the surface of travel. As such, the tires provide a horizontal force that is reacted to by an equal horizontal force in the opposite direction due to the friction. If the force of friction is less, slippage between the tire and surface of travel will occur, as may occur on icy or muddy surfaces, where the coefficient of friction between the vehicle's tires and the icy or muddy surface may be less than the coefficient of friction between the vehicle's tires on a dry surface. When slippage occurs, not only does the vehicle fail to propel as expected, the vehicle can lose control of its travel direction, and can also lose energy due to the slippage rather than using it to propel. Accordingly, there are opportunities to improve today's vehicle drive systems.

SUMMARY

Briefly, apparatus employ weights within a spherical assembly whereby the spherical assembly rotates the weights so as to use gravitational force as well as centrifugal forces generated by the rotating weights to propel the spherical assembly. For example, the apparatus can employ suitably shaped weights within a spherical assembly whereby the spherical assembly rotates the weights so as to continuously maintain its center of gravity in the forward half of the spherical assembly regardless of its rotation while using a moment due to gravitational force acting on the weights, as well the centrifugal forces generated by the rotating weights, to propel the spherical assembly.

In some embodiments, the spherical assembly includes a spherical encasing, two motors, such as electric motors, two weights, and a controller, such as a processor. The first motor is connected to the first weight and the spherical encasing, and the second motor is connected to the second weight and the spherical encasing. For example, the motors may be connected to the spherical encasing in positions that are opposite of each other along a centerline of the spherical encasing. In some examples, the two weights weigh the same.

The controller is operatively coupled to the first motor and to the second motor, such that the controller can control each of the motors (e.g., control the direction and speed at which the motors rotate). The controller is configured to cause the first motor to rotate the first weight in a certain direction at a rotational speed (e.g., rotational rate), which can be based on a rotational (e.g., rolling) speed of the spherical assembly. For example, assuming the spherical assembly is rotating at a given rotational speed, the controller activates the first motor such that it rotates the first weight at the same rotational speed of the spherical assembly. As another example, the controller can cause the first motor to rotate the first weight at a rotational speed that is slower than, or greater than, the rotation speed of the spherical assembly. Similarly, the controller is configured to cause the second motor to rotate the second weight in a certain direction at a rotational speed, which can also be based on the rotational speed of the spherical assembly. For example, the controller can be configured to cause the rotational speed of the first motor and the rotational speed of the second motor to be the rotational speed of the spherical assembly. As such, the controller may maintain the center of gravity of the first weight and the second weight in a half of the spherical assembly as the spherical assembly rotates (e.g., forward half of spherical assembly, or the half closest to the direction of travel of the spherical assembly).

In some examples, the controller causes the first motor to rotate the first weight in one direction, and causes the second motor to rotate the second weight in the same or another direction. For example, the controller can cause the first motor to rotate the first weight in a clockwise direction, and cause the second motor to rotate the second weight in a counter-clockwise direction.

In some examples, the controller is configured to cause the first motor to change the rotational speed of the first weight from a current rotational speed to the current rotational speed of the spherical assembly. The processor can also cause the second motor to change the rotational speed of the second weight from a current rotational speed to the rotational speed of the spherical assembly. For example, the processor can cause the first and second motors to cause the centers of gravity of both of the oppositely rotating weights to coincide in a one half of the spherical assembly, which can be the rotational forward half of the spherical assembly within a 360 degree horizontal plane of the spherical assembly. The first and second motors may be rotated in opposite directions.

In some examples, the controller is configured to cause the first motor to change the rotational speed of the first weight in relation to the rotational speed of the second weight to change a direction of travel of the spherical assembly. For example, the controller can be configured to cause the first motor to momentarily change the rotational speed of the first weight in relation to the opposite rotational speed of the second weight to horizontally shift the location where the centers of gravity of the two weights coincide. This can cause the direction of travel of the spherical assembly to change. As another example, assuming the first motor and the second motor are rotating the first weight and the second weight, respectively, at the same rotational speed (e.g., controller is rotating the first motor and the second motor at the same rotational speed), the controller can slow down, or speed up, the first motor so that the first weight's rotational speed is different than that of the second weight. Similarly, the controller can slow down, or speed up, the second motor so that the second weight's rotational speed is different than that of the first weight.

In some embodiments, the controller is configured to cause the first motor to rotate the first weight such that the first weight provides a greatest moment of a gravitational force to a point along a center axial line (i.e., a vertical radial center line) of the spherical assembly. For example, assuming the spherical assembly is not rotating (e.g., at a standstill), the center of gravity of the spherical assembly is along the center axial line of the spherical assembly. The controller may rotate the first weight such that the center of gravity of the spherical assembly moves away from the center axial line of the spherical assembly, thus causing the spherical assembly to rotate.

In some embodiments, the controller is configured to cause the first motor and the second motor to rotate the first weight and the second weight respectively at opposite but equal speeds. The rotational speeds of the weights can be equal to the rotating speed of the spherical assembly. The centers of gravity of the two weights can coincide at a certain location on an imaginary plane defined by the spherical assembly's geometrical vertical centerline and the spherical assembly's travel direction. In some examples, the controller is configured to cause the two motors to momentarily and equally slow down or speed up their equal but opposite rotational speeds from the spherical assembly's rotating speed. The controller can also control the duration (e.g., length of time) of the momentary slow down or speed up of the rotation of the weights. By slowing down or speeding up the weights rotational speeds, the centers of gravity of the two weights can coincide at a new location on the imaginary plane. The new location can be in a forward half, or a backward half, of the spherical assembly. For example, by causing the centers of gravity of the two weights to coincide at a location of the backward half of the spherical assembly, the rotation of the spherical assembly may be slowed down or stopped.

In some examples, the controller is configured to cause the second motor to rotate the second weight such that the second weight provides a greatest moment of a gravitational force to the point along the center axial line of the spherical assembly simultaneous to when the controller causes the first motor to rotate the first weight to provide the greatest moment of the gravitational force to the center axial line of the spherical assembly. As an example, assuming the spherical assembly is rotating at a rotational speed, the controller may cause the first motor and the second motor to rotate the first weight and the second weight in opposite directions at the same rotational speed as that of the spherical assembly. In this example, the processor rotates the weights such that they provide the largest possible moment of the gravitational force on the weights to the center axial line of the spherical assembly twice per spherical assembly rotation.

In some embodiments, a planar surface of the first weight forms an angle greater than 0 degrees (e.g., 1 degree) with respect to a center axial line of the spherical assembly. In some examples, a planar surface of the second weight forms an angle greater than 0 degrees with respect to the center axial line of the spherical assembly. For example, the weights can be configured such that a side of each weight faces the center of the spherical assembly at the same angle. In some examples, planar surfaces of the first weight and the second weight form a 0-degree angle with respect to a center axial line of the spherical assembly.

In some embodiments, a spherical assembly includes a spherical inner assembly and a spherical outer assembly. The spherical inner assembly encases a first motor connected to a first weight and a second motor connected to a second weight. The spherical inner assembly also encases a controller that is operatively coupled to the first motor and to the second motor. The controller can be configured to cause the first motor to rotate the first weight in a direction at a rotational speed based on a rotational speed of the spherical inner assembly. The controller can also be configured to cause the second motor to rotate the second motor in the same or different direction at a rotational speed based on the rotational speed of the spherical inner assembly. For example, the controller may cause the first motor and the second motor to rotate the first weight, and the second weight, respectively, at the same rotational speed but in opposite directions. As another example, the controller may cause the first motor and the second motor to rotate the first weight and the second weight, respectively, at the rotational speed of the spherical inner assembly.

In some examples, the spherical assembly may use electric power (e.g., via on or more electric motors) to rotate the weights within the spherical assembly. In some embodiments, the weights may include radial magnetic cores and crossing current carrying conductors through which the apparatus can provide an electrical current. The current carrying conductors may be embedded in the weights. For example, the apparatus can provide a radial magnetic flux through the radial magnetic cores such that, as the weights rotate through the magnetic flux, a magnetic force is applied to the weights. The force can be perpendicular to the direction of the radial magnetic flux and current directions. The magnetic force can be used for propulsion of the spherical assembly. For example, the magnetic force can increase the rotational speed of the spherical inner assembly. In some examples, the direction of the current flowing through the conductors can be reversed, which can cause a force to be generated in an opposite direction. The force can cause the rotational speed of the spherical assembly to decrease (e.g., slow down). As such, the magnetic force generated can be in addition to, or against, a gravitational force acting on the weights. A controller may control the current in the conductors to assist in speeding up, or slowing down, the spherical inner assembly. The controller may also adjust the rotational speed of the weights to match a new speed of the spherical inner assembly.

In some examples, a controller may adjust the rotational speed of the weights to match that of the spherical inner assembly. In some examples, current is generated in the conductors as the weights rotate through the generated magnetic flux. The controller may direct this generated current to charge batteries located within the assembly.

As such, the spherical assembly can operate without, or independently of, an internal combustion engine. The spherical assembly can also operate without, or independently of, a traditional gearbox and steering mechanism. In some examples, a vehicle, such as a car, truck, semi-truck, amphibious vehicle, or any other suitable vehicle, uses one or more spherical assemblies for propulsion. For example, the one or more spherical assemblies may be wirelesses controlled from a controller. Other uses that would be recognized by those skilled in the art having the benefit of these disclosures are also contemplated.

In some examples, the spherical assembly also includes first radial magnetic windings affixed to the spherical outer assembly and second magnetic windings affixed to the spherical inner assembly. The first magnetic windings and the second magnetic windings may be of opposite polarities, thereby creating magnetic fields between the spherical outer assembly and the spherical inner assembly. For example, the magnetic windings may provide magnetic fields either from the spherical outer assembly to the spherical inner assembly, or vice versa, thus creating a magnetic flux between the spherical outer assembly and spherical inner assembly in a given direction. In some examples, the magnetic windings can alternately be rare earth permanent magnets.

In some examples, a vehicle includes one or more spherical assemblies, where each spherical assembly is surrounded by a spherical enclosure. The spherical enclosure may surround more than half of the spherical assembly. The spherical enclosure can include magnetic windings of a polarity similar to that of magnetic windings located in the spherical outer assembly. As such, magnetic forces caused by the respective magnetic windings will oppose each other so as to provide magnetic levitation between the spherical enclosure and the spherical outer assembly.

In some examples, the spherical outer assembly encases the spherical inner assembly. The spherical inner assembly can also encase a friction reducer configured to minimize friction between the spherical inner assembly and the spherical outer assembly. For example, the friction reducer can be a lubricant, such as oil, a mechanical means, such as ball bearings, any combination of these, or any other known method of reducing friction. In one example, the friction reducer includes at least one ball bearing in a flow path of oil located between the spherical inner assembly and the spherical outer assembly. In some examples, the spherical outer assembly includes an inner shell and an outer shell, where the inner shell is in contact with the friction reducer.

In some examples, the spherical assembly includes one or more motion detectors. The motion detectors can be used to detect the rotational speed of the spherical inner assembly. The motion detectors can also be used to detect the rotational speed of the spherical outer assembly. Any given motion detector can be in communication with the controller, whereby the controller can detect a rotational speed as provided by the motion detector. For example, the controller may be electrically coupled to the motion detector thereby allowing for wired communications, or may communicate with the motion detector wirelessly.

In some examples, at least one motion detector is in communication with the controller and configured to detect the rotational speed of the spherical inner assembly. Based on the detected rotational speed of the spherical inner assembly, the controller can determine at what rotational speed (e.g., rate) to rotate the first and second motors as described above. In some examples, the motion detector may be coupled to the spherical outer assembly, such that detection of the rotational speed of the spherical inner assembly is with respect to the rotational speed of the spherical outer assembly. In some examples, the rotational speed of the spherical inner assembly can be detected by the controller by monitoring the cycle of the electric current draw by the motors as they rotate their respective weights. For example, the controller may access a table, such as a look-up table, stored in memory that translates current draw to motor workload. Based on the amount of current drawn, the controller may determine the workload of a respective motor. The controller may then employ one or more functions, such as a logarithmic function, to determine the rotational speed of the spherical inner assembly.

In some examples, at least one motion detector is in communication with the controller and configured to detect the rotational speed of the spherical outer assembly. In this manner, the controller can determine, for example, the "rolling" speed of the spherical outer assembly.

In some examples, such as at higher rotating speeds, the rotating weights can cause multi-direction centrifugal forces that act on the spherical assembly. These centrifugal forces may create off-center opposing forces producing unintended moments that can affect the direction of travel of the spherical assembly. The controller, however, can correct for these directional changes based on detected rotational speeds as described above and further below.

In some examples, a spherical assembly includes a rotating spherical encasing, up to three motors, such as electric motors, three weights, and a controller, such as a processor. A first motor is connected to the first weight and the spherical encasing, a second motor is connected to the second weight and the spherical encasing, and a third motor is connected to the third weight and the spherical encasing. For example, the motors may be connected to the spherical encasing in positions that are along a centerline of the spherical encasing. In some examples, one weight weighs twice that of each of the other two weights. For example, the lighter weights may weigh approximately the same, where the heavier weight weighs approximately twice that of each of the lighter weights. This heavier weight may be caused by a motor to rotate in one direction, while the lighter weights are caused by respective motors to rotate in an opposite direction. The centers of gravity of the heavier weight and the two lighter weights may be caused by respective motors to rotate at equal radii in three different equally spaced imaginary parallel planes which may be perpendicular to that of the spherical encasing. In this embodiment centrifugal forces acting on the weights, as they rotate, can propel the spherical assembly in a direction of travel (e.g., forward). In some examples, the controller rotates the heavier weight such as to offset centrifugal forces, such as undesired centrifugal forces, caused by the other two (and lighter) weights on the spherical assembly.

Methods to propel the spherical assembly are also contemplated. The methods can be carried out by, for example, the spherical assemblies or any components thereof described above. For example, a method, by a controller, to propel a spherical assembly includes causing a first motor to rotate a first weight in a first direction at a first rotational speed based on a rotational (e.g., rolling) speed of the spherical assembly. The method also includes causing a second motor to rotate a second weight in a second direction at a rotational second speed based on the rotational speed of the spherical assembly.

In some examples, the method also includes causing the first rotational speed of the first weight and the second rotational speed of the second weight to be at the rotational speed of the spherical assembly.

In some examples, the method includes causing the first motor to rotate the first weight such that the first weight provides a greatest moment of a gravitational force to a point along a center axial line of the spherical assembly. The method can also include causing the second motor to rotate the second weight such that the second weight provides a greatest moment of a gravitational force to the point along the center axial line of the spherical assembly. In some examples, the controller rotates the motors such that the moments of gravitational force provided by the first and second weights are simultaneous.

In some examples, the method includes causing the first rotational speed of the first motor to change in relation to the rotational second speed of the second motor to change a direction of travel of the spherical assembly.

In some examples, a method includes causing a first motor to rotate a first weight in a first direction at a first rotational speed, causing a second motor to rotate a second weight and a third motor to rotate a third weight in a second and opposite direction, based on a rotational (e.g., rolling) speed of the spherical assembly. In some examples, the first weight weighs approximately twice that of each of the second and third weights (e.g., the second and third weights weigh the same, and the first weight weighs twice that of the second or third weight). The method may include rotating the first weight such that it offsets centrifugal forces acting on the spherical assembly caused by the rotation of the second and third weights. Other methods in accordance with the disclosures herein are also contemplated.

Among other advantages, the apparatus and methods can provide for propulsion without the need for a combustion engine, a gearbox, or a conventional steering mechanism. They can also allow for the changing of a direction of travel without requiring a large turning radius. In some examples, the apparatus and methods provide for propulsion of land vehicles. As such, the apparatus and methods may improve road traction control and reduce road slippage. The apparatus and methods may also reduce a vehicle's distance to a stop. In addition, the apparatus may require less components over traditional combustion engines, and can provide cost benefits as well.

In some examples, the apparatus and methods provide controlled centrifugal forces that may enable land vehicles to overcome vertical terrain or propel flying land vehicles close to earth all while allowing its batteries to charge wirelessly. For example, one or more spherical assemblies may provide initial propellant for air vehicles (e.g., rockets) by providing liftoff power during a take-off stage. In some examples, one or more spherical assemblies may replace maglev linear motors that propel high-speed trains. This may lower train-operating costs, as the train systems rails required for maglev trains may be comparatively expensive.

Other advantages of these disclosures will be readily apparent to one skilled in the art to whom the disclosures are provided from a perusal of the claims, the appended drawings, and the following detail description of the embodiments.

BRIEF DESCRIPTION OF THE DRAWINGS

FIGS. 2A-2C illustrate a spherical assembly rotating weights at a rotational speed of the spherical assembly in accordance with some embodiments of the present disclosure;

FIGS. 5A-5C illustrate a spherical assembly rotating weights at half of a rotational speed of the spherical assembly in accordance with some embodiments of the present disclosure;

FIGS. 11A and 11B illustrate a spherical assembly rotating two weights at a rotational speed of the spherical assembly in accordance with some embodiments of the present disclosure;

FIGS. 12A and 12B illustrate a spherical assembly rotating two weights at a rotational speed of the spherical assembly in accordance with some embodiments of the present disclosure;

FIGS. 14C, 14D, 14E, and 14F illustrate examples of the spherical assemblies of FIGS. 14A and 14B in accordance with some embodiments of the present disclosure.

DETAILED DESCRIPTION

Figure 1:
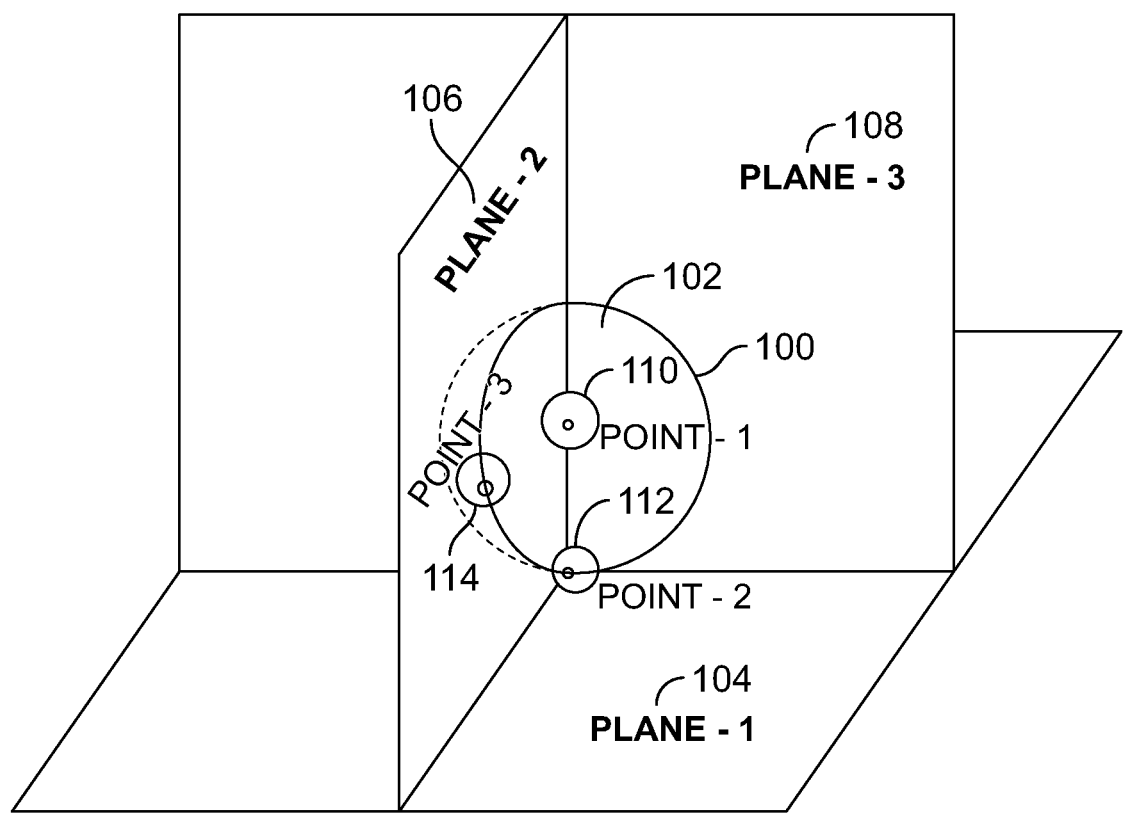
FIG. 1 illustrates a sphere of uniform density to illustrate prior art concepts.

While the present disclosure is susceptible to various modifications and alternative forms, specific embodiments have been shown by way of example in the drawings and will be described in detail herein. The objectives and advantages of the claimed subject matter will become more apparent from the following detailed description of the preferred embodiments thereof in connection with the accompanying drawings. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

FIG. 1 illustrates a sphere 100 of uniform density 102 with three dimensions as identified by plane-1 104, plane-2 106, and plane-3 108. For example, plane-1 104 may represent a plane along an x direction, plane-3 108 may represent a plane along the y direction, and plane-2 106 may represent a plane along the z direction in an x,y,z coordinate system. The geometrical center of sphere 102 is identified by point-1 110. When placed on a surface, the sphere 102 will have a single point of contact, namely, at point-2 112. If gravity is the only force applied to the sphere 102, it will stand still in a steady state of equilibrium. Because sphere 102 is of uniform density, its center of gravity appears along a vertical line intersecting point-2 112 and point-1 110.

If, however, a weight is embedded into sphere 102, sphere 102 will no longer be of uniform density. As a result, its center of gravity will shift and can lie outside the vertical line intersecting point-2 112 and point-1 110. For example, the center of gravity may shift to a vertical line intersecting plane-1 104 and point-3 114. As a result (assuming no other forces), sphere 102 will rotate (e.g., roll) along plane 1 104 towards the direction of point-3 114. Sphere 102 will continue rotating until a new steady state of equilibrium is established. Specifically, when the sphere 102 has stopped rotating, its center of gravity identified by point-3 114 will be along a vertical line with sphere's 102 new point of contact along plane-1 104.

FIGS. 2A-2C illustrates a spherical assembly 200 as it rolls along a plane 295 in three views, namely a side view in FIG. 2A, a top view in FIG. 2B, and a schematic view in FIG. 2C. The spherical assembly 200 includes spherical encasing 256, first motor 248, second motor 250, first weight 252, and second weight 254. The first motor 248 is connected to first weight 252 and the spherical encasing 256. Likewise, second motor 250 is connected to second weight 254 and spherical encasing 256. The side view in FIG. 2A shows spherical assembly 200 from a side as it rotates along plane 295. The top view in FIG. 2B views the same spherical assembly 200 as it rotates along plane 295, but from a top view. The schematic view in FIG. 2C also shows the same spherical assembly 200 as it rotates along plane 295, but with an angle at each position that shows a face (e.g., planar side) of the weights.

It is noted that, as with respect to FIGS. 2A-2C, and 3-5, it is assumed that the only forces acting on spherical assembly 200 include gravity acting on the weights 252, 254, and a frictional force in the direction of travel at the spherical assembly's 200 contact point with the plane 295 (e.g., spherical assembly is rolling on the plane 295 in a vacuum). Assuming a constant rotational speed of spherical assembly 200, the three views of FIGS. 2A-2C show spherical assembly 200 as it rotates along plane 295 at each point after one-eighth of a rotation. For example, in the side view of FIG. 2A, position 202 is the beginning of a full rotation of spherical assembly 200 (and similarly at position 218 of the top view in FIG. 2B and position 234 of the schematic view in FIG. 2C). Position 204 shows spherical assembly 200 after one-eighth of a rotation (and similarly at position 220 of the top view in FIG. 2B and position 236 of the schematic view in FIG. 2C); position 206 shows spherical assembly 200 after two-eighths of a rotation (and similarly at position 222 of the top view in FIG. 2B and position 238 of the schematic view in FIG. 2C); position 208 shows spherical assembly 200 after three-eighths of a rotation (and similarly at position 224 of the top view in FIG. 2B and position 240 of the schematic view in FIG. 2C); position 210 shows spherical assembly 200 after four-eighths of a rotation (and similarly at position 226 of the top view in FIG. 2B and position 242 of the schematic view in FIG. 2C); position 212 shows spherical assembly 200 after five-eighths of a rotation (and similarly at position 228 of the top view in FIG. 2B and position 244 of the schematic view in FIG. 2C); position 214 shows spherical assembly 200 after six-eighths of a rotation (and similarly at position 230 of the top view in FIG. 2B and position 246 of the schematic view in FIG. 2C); and position 216 shows spherical assembly 200 after seven-eighths of a rotation (and similarly at position 232 of the top view in FIG. 2B and position 247 of the schematic view in FIG. 2C). The top view of FIG. 2B shows the same positions of the spherical assembly as it rotates as the side view of FIG. 2A, but from an angle from above. The schematic view of FIG. 2C shows a view as if looking at an angle perpendicular to the plane of the weights at each position.

In addition, in FIGS. 2A-2C, and 3-5, weights 252, 254 are shaped as half of a circle, with each in a separate half of spherical assembly 200. It is to be appreciated, however, that the weights can be in other shapes as well. For example, the weights can be shaped as less than a half circle, as squares, as spheres, discs, spherical wedges, as less than one quarter spheres, or in any other shape.

In this example, motors 248, 250 rotate weights 252, 254, respectively, at the rotational speed of the spherical assembly. For example, weights 252 and 254 complete one full rotation within spherical assembly 200 at the same time that spherical assembly 200 itself completes one full rotation. Furthermore, in this example, the motors 248, 250 rotate the weights 252, 254 in opposite directions. At position 202 in the side view of FIG. 2A (and similarly at position 218 of the top view in FIG. 2B and position 234 of the schematic view in FIG. 2C), the weights provide the largest moment of a gravitational force to a point along a center axial line of the spherical assembly 200. At this position, the weights 252, 254 coincide in a forward half (i.e., the half closest to the direction of travel) of spherical assembly 200. This is because, at this point in the rotation, the weights 252, 254 are aligned along a center horizontal axis of the spherical assembly 200 and are furthest from the center axial line of the spherical assembly 200.

As the sphere rotates, motors 248, 250 rotate weights 252, 254 at the same rotational speed as the rotational speed of spherical assembly 200. As such, after one half of a rotation of spherical assembly 200, identified by position 210 in the side view (and similarly by position 226 of the top view and position 242 of the schematic view), the weights 252, 254 will again coincide in the front half of spherical assembly 200, but this time weight 254 appears on top of weight 252. Again, however, the weights 252, 254 are aligned along a center horizontal axis of the spherical assembly 200. As such, they provide the largest moment of a gravitational force to a point along a center axial line of the spherical assembly 200. In other words, the gravitational force acting on weights 252, 254 provides a moment to spherical assembly 200 in its direction of travel. As such, spherical assembly 200 will continue to rotate in the same direction. As mentioned above, the three different views show the positions of the weights at one-eight rotational increments as the spherical assembly rotates along the plane 295.

Figure 3A:
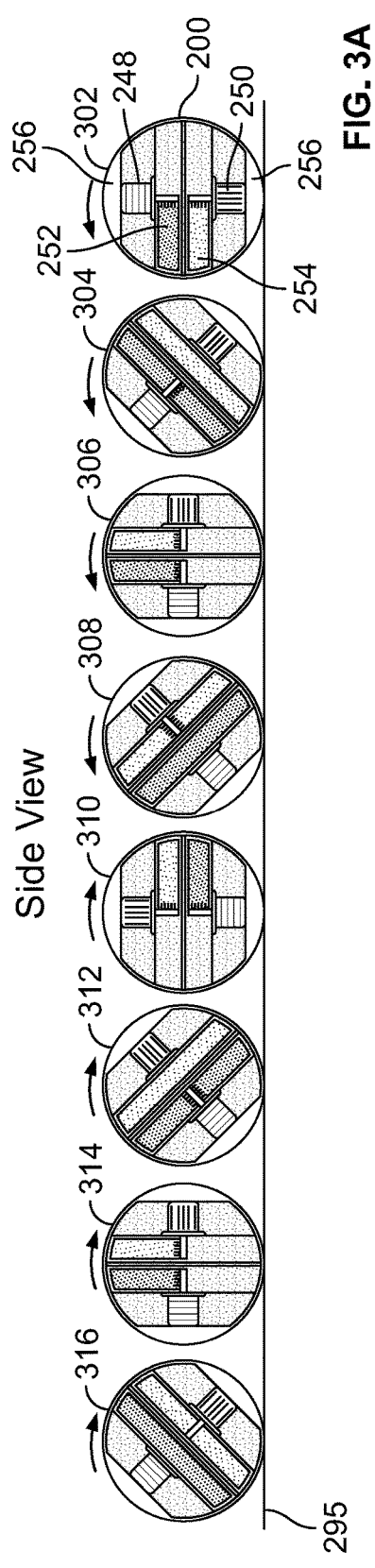
FIGS. 3A-3C illustrate a spherical assembly rotating weights at double of a rotational speed of the spherical assembly in accordance with some embodiments of the present disclosure.
Figure 3B:
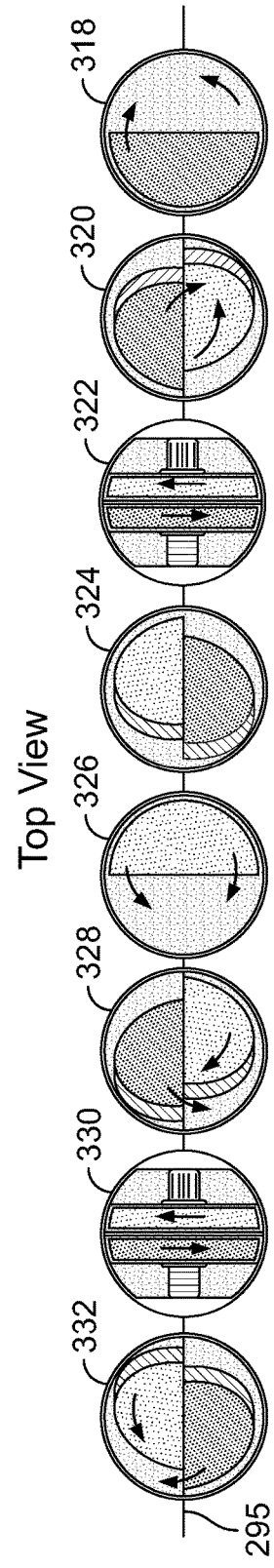
Figure 3C:
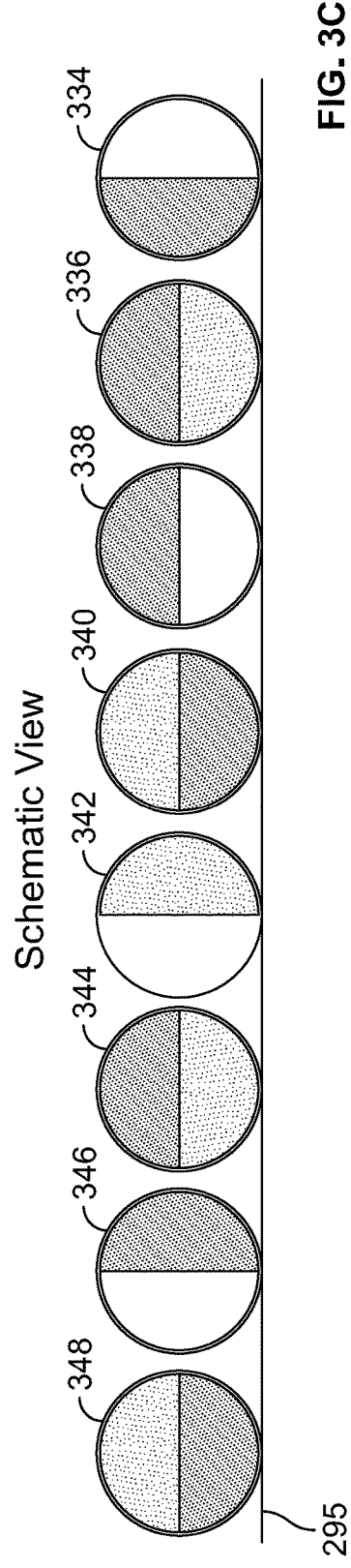

The direction of travel of the spherical assembly 200 can be controlled by rotating weights 252, 254 at a rotational speed that is greater than, or less than, the rotational speed of spherical assembly 200. For example, FIGS. 3A-3C illustrate the spherical assembly 200 of FIGS. 2A-2C as it rolls along a plane 295 again in three views (i.e., a side view in FIG. 3A, a top view in FIG. 3B, and a schematic view in FIG. 3C). In this example, however, motors 248, 250 rotate weights 252, 254, respectively, at double the rotational speed of the spherical assembly. As with FIG. 2, the three different views in this example also show the positions of the weights at one-eight rotational increments as the spherical assembly rotates along the plane 295. Position 302 in the side view of FIG. 3A corresponds to position 318 in the top view of FIG. 3B and to position 334 in the schematic view of FIG. 3C. Similarly, position 304 in the side view of FIG. 3A corresponds to position 320 in the top view of FIG. 3B and to position 336 in the schematic view of FIG. 3C; position 306 in the side view of FIG. 3A corresponds to position 322 in the top view of FIG. 3B and to position 338 in the schematic view of FIG. 3C; position 308 in the side view of FIG. 3A corresponds to position 324 in the top view of FIG. 3B and to position 340 in the schematic view of FIG. 3C; position 310 in the side view of FIG. 3A corresponds to position 326 in the top view of FIG. 3B and to position 342 in the schematic view of FIG. 3C; position 312 in the side view of FIG. 3A corresponds to position 328 in the top view of FIG. 3B and to position 344 in the schematic view of FIG. 3C; position 314 in the side view of FIG. 3A corresponds to position 330 in the top view of FIG. 3B and to position 346 in the schematic view of FIG. 3C; and position 316 in the side view of FIG. 3A corresponds to position 332 in the top view of FIG. 3B and to position 348 in the schematic view of FIG. 3C. At position 302 in the side view of FIG. 3A (and similarly at position 318 in the top view of FIG. 3B and position 334 in the schematic view of FIG. 3C), weights 252, 254 provide the largest moment of a gravitational force to a point along a center axial line of the spherical assembly 200.

Because the weights 252, 254 rotate at double the rotational rate of the spherical assembly 200, after a full rotation of spherical assembly 200, the weights will make two full rotations within spherical assembly 200. For example, after one half of a rotation of spherical assembly 200, identified by position 310 in the side view of FIG. 3A (and similarly by position 326 of the top view in FIG. 3B and position 342 of the schematic view in FIG. 3C), the weights 252, 254 have completed a full rotation. Weight 254 appears on top of weight 252 because the spherical assembly has completed only a half of a rotation. At this position, the weights provide a moment of the gravitation force to a point along the center axial line of spherical assembly 200 as against the rotational direction of spherical assembly 200. For example, in this position the weights would act to slow down or stop the rotation of spherical assembly 200.

Figure 4A:
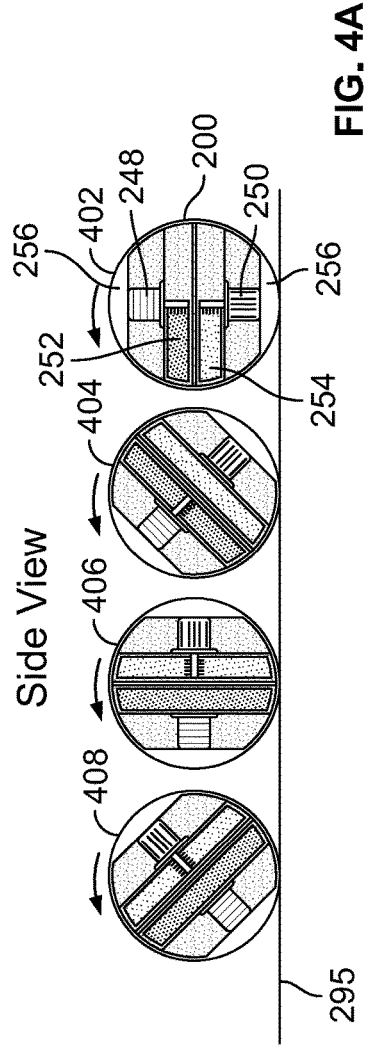
FIGS. 4A-4C illustrate a spherical assembly rotating weights at triple of a rotational speed of the spherical assembly in accordance with some embodiments of the present disclosure.
Figure 4B:
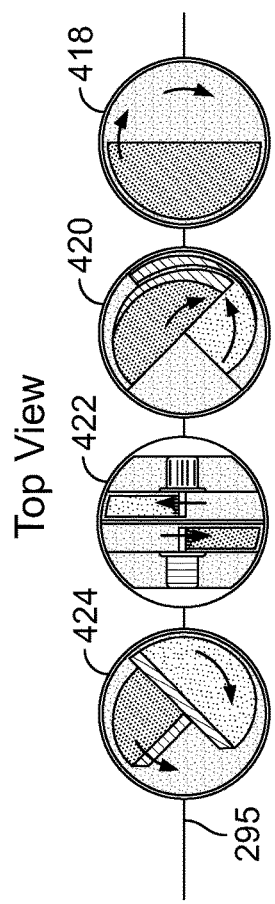
Figure 4C:
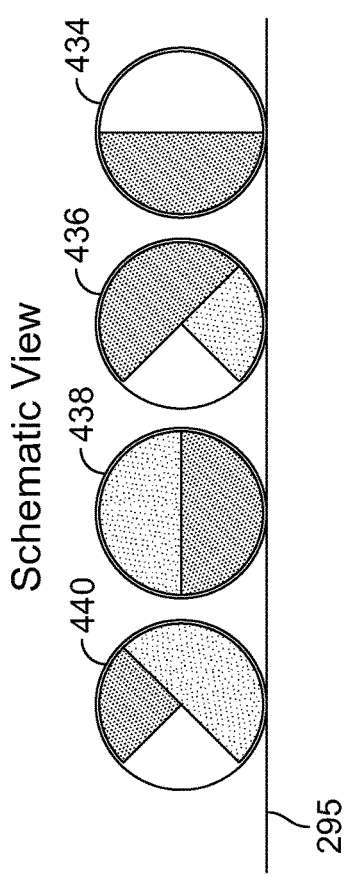

FIGS. 4A-4C illustrate the spherical assembly 200 of FIGS. 2A-2C as it rolls along a plane 295 again in three views (i.e., a side view in FIG. 4A, a top view in FIG. 4B, and a schematic view in FIG. 4C). In this example, however, motors 248, 250 rotate weights 252, 254, respectively, at triple the rotational speed of the spherical assembly. As with FIGS. 2A-2C, the three different views in this example also show the positions of the weights at one-eight rotational increments as the spherical assembly rotates along the plane 295. Position 402 in the side view of FIG. 4A corresponds to position 418 in the top view of FIG. 4B and to position 434 in the schematic view of FIG. 4C. Similarly, position 404 in the side view of FIG. 4A corresponds to position 420 in the top view of FIG. 4B and to position 436 in the schematic view of FIG. 4C; position 406 in the side view of FIG. 4A corresponds to position 422 in the top view of FIG. 4B and to position 438 in the schematic view of FIG. 4C; and position 408 in the side view of FIG. 4A corresponds to position 424 in the top view of FIG. 4B and to position 440 in the schematic view of FIG. 4C. At position 402 in the side view of FIG. 4A (and similarly at position 418 in the top view of FIG. 4B and position 434 in the schematic view of FIG. 4C), weights 252, 254 provide the largest moment of a gravitational force to a point along a center axial line of the spherical assembly 200.

Because the weights 252, 254 rotate at triple the rotational rate of the spherical assembly 200, after a full rotation of spherical assembly 200, the weights will make three full rotations within spherical assembly 200. However, because the weights are being rotated at triple the rotational rate of the spherical assembly 200, the rotation of the weights 252, 254 will cause the spherical assembly to slow down. For example, after one eighth and before two eighth of a rotation of spherical assembly 200, identified by positions 404 & 406 in the side view in FIG. 4A (and similarly by positions 420 & 422 of the top view in FIG. 4B and positions 436 & 438 of the schematic view in FIG. 4C), the weights 252, 254 will fully coincide (e.g., be aligned) in the back half (e.g., in relation to spherical assembly's 200 direction of travel) of the rotating spherical assembly 200 and will cause spherical assembly 200 to slow down. Eventually, spherical assembly will reverse its direction.

FIGS. 5A-5C illustrate the spherical assembly 200 of FIGS. 2A-2C as it rolls along a plane 295 again in three views (i.e., a side view in FIG. 5A, a top view in FIG. 5B, and a schematic view in FIG. 5C). In this example, however, motors 248, 250 rotate weights 252, 254, respectively, at half of the rotational speed of the spherical assembly. As with FIGS. 2A-2C, the three different views in this example also show the positions of the weights at one-eight rotational increments as the spherical assembly rotates along the plane 295. Position 502 in the side view of FIG. 5A corresponds to position 518 in the top view of FIG. 5B and to position 534 in the schematic view of FIG. 5C. Similarly, position 504 in the side view of FIG. 5A corresponds to position 520 in the top view of FIG. 5B and to position 536 in the schematic view of FIG. 5C; position 506 in the side view of FIG. 5A corresponds to position 522 in the top view of FIG. 5B and to position 538 in the schematic view of FIG. 5C; position 508 in the side view of FIG. 5A corresponds to position 524 in the top view of FIG. 5B and to position 540 in the schematic view of FIG. 5C; position 510 in the side view of FIG. 5A corresponds to position 526 in the top view of FIG. 5B and to position 542 in the schematic view of FIG. 5C; position 512 in the side view of FIG. 5A corresponds to position 528 in the top view of FIG. 5B and to position 544 in the schematic view of FIG. 5C; position 514 in the side view of FIG. 5A corresponds to position 530 in the top view of FIG. 5B and to position 546 in the schematic view of FIG. 5C; and position 516 in the side view of FIG. 5A corresponds to position 532 in the top view of FIG. 5B and to position 548 in the schematic view of FIG. 5C. At position 502 in the side view of FIG. 5A (and similarly at position 518 in the top view of FIG. 5B and position 534 in the schematic view of FIG. 5C), weights 252, 254 provide the largest moment of a gravitational force to a point along a center axial line of the spherical assembly 200.

Because the weights 252, 254 rotate at half of the rotational rate of the spherical assembly 200, after a full rotation of spherical assembly 200, the weights will make one half of a full rotation within spherical assembly 200. For example, after one quarter of a rotation of spherical assembly 200, identified by position 508 in the side view of FIG. 5A (and similarly by position 524 of the top view of FIG. 5B and position 540 of the schematic view of FIG. 5C), the weights 252, 254 have completed an eighth of a rotation. At that position, each weight's center of gravity starts to move into the back half of the spherical assembly 200 creating a moment that opposes its travel direction thus cause spherical assembly 200 to slow down.

Figure 6:
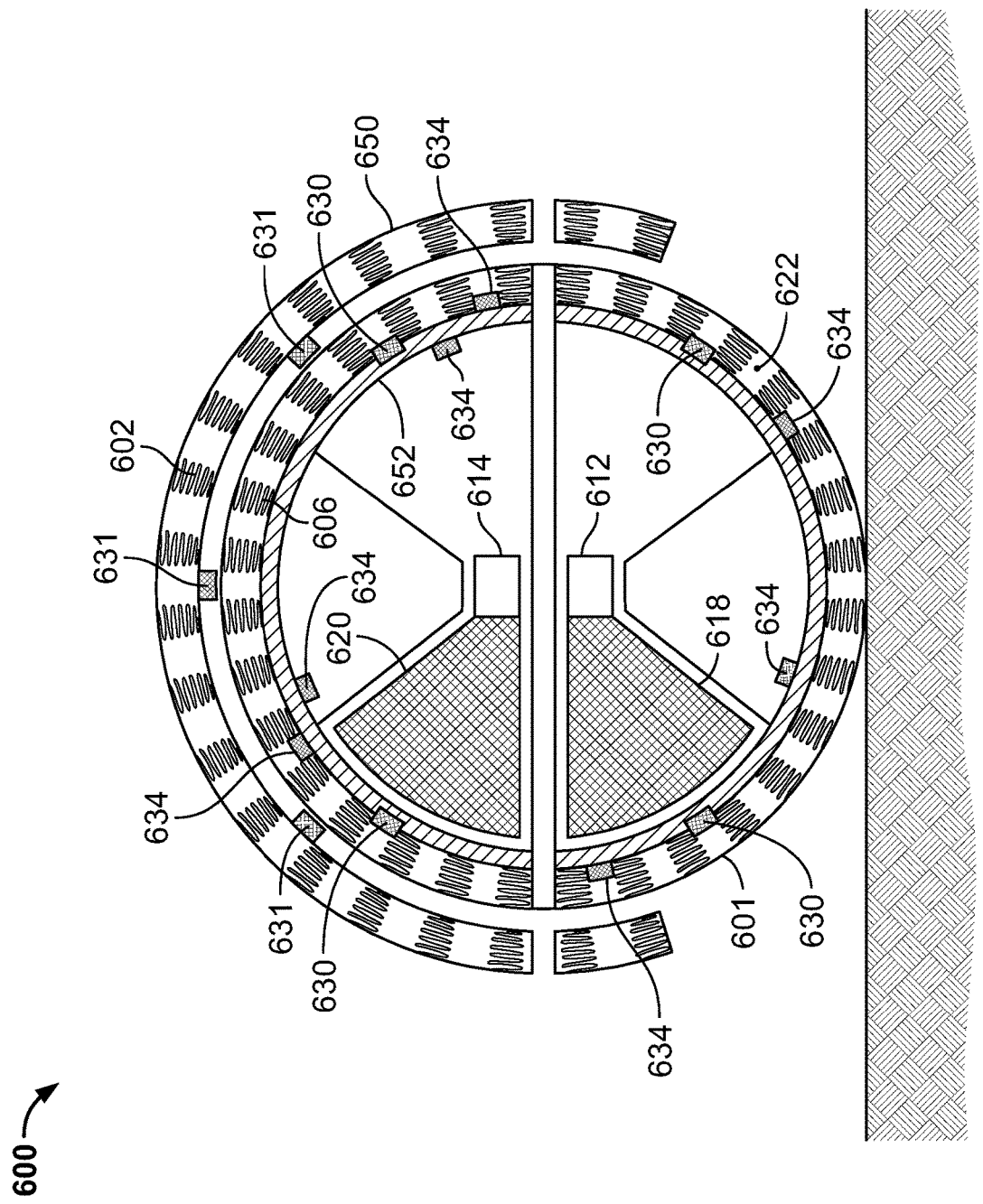
FIG. 6 illustrates a spherical assembly system in accordance with some embodiments of the present disclosure.

FIG. 6 illustrates a spherical assembly system 600 that includes a spherical well (e.g., fender) 650 and a spherical assembly 601. Spherical well 650 can surround at least half of spherical assembly 601. Spherical assembly 601 includes an outer spherical assembly 622, which can contact a surface, such as the ground, and an inner spherical assembly 652. Outer spherical assembly 622 includes magnetic windings 606. In this example, spherical well 650 includes one or more magnetic windings 602. Magnetic windings 602 and 606 can be, for example, windings of a radial magnetic core. In some examples magnetic windings 602 are the same polarity of magnetic windings 606 of outer spherical assembly 622. In this manner, because the windings would repel each other, a magnetic force is applied to the spherical well 650. In some examples, all (e.g., 4) spherical wells of a vehicle include magnetic windings 602. The magnetic windings 602 and magnetic windings 606 are configured to provide a magnetic force to a vehicle such that it supports some of the vehicle's weight. In some examples, all of the vehicle's weight is supported via magnetic force (e.g., magnetic levitation).

In some examples, spherical well 650 includes one or more brakes 631 to slow down or stop rotation of the outer spherical assembly 622. The brakes 631 can aid in slowing down or stopping the rotation of spherical assembly 601. In addition, brakes 630 can be located between the inner spherical assembly 652 and the outer spherical assembly 622. The brakes 630, 631 may be of any suitable type, such as mechanical brakes that are electronically controlled (e.g., electromechanical brakes).

In some examples, inner spherical enclosure 652 also contains chargeable electric batteries and controllers. Outer spherical assembly 622 can contain radial magnetic core and windings 606 homogeneously covering some or all of its outside surface. Outer spherical assembly 622 can also contains chargeable electric batteries and controllers (not shown). The controllers may also be connected to one or more motion detectors 634. The motion detectors 634 can be any suitable type, such as one that can indicate absolute and relative rotational speeds.

In some examples, a controller (not shown) can activate the spherical assembly 601 by causing motors 612, 614 to start rotating their associated weights 618, 620, respectively, at a preset low speed. The controller can also control and modulate the brakes 631, as well as brakes 630 between the inner spherical assembly 652 and the outer spherical assembly 622 to adjust the inner assembly rotating speed and match the preset low speed of weights 618, 620 detected via motion detectors 634. Upon receiving, for example, a wireless signal from an operator of a desired direction of travel, the controller can create momentary differences in the weights' 618, 620 rotational speeds. The amount and duration of the change in speeds can be based on a desired direction of travel. The same polarity magnetic windings 602, 606 in both of the outer spherical assembly 622 and the spherical well 650 can be activated by the controller to produce a magnetic levitation force to the spherical well 650. The controller can also release the breaks 630 between them so that the spherical assembly 601 is free to move in the desired direction.

In some examples, upon wireless input signals from the operator, the controller is operable to control the spherical assembly's 601 speed and direction. The weights 618, 620 can be rotated (e.g., in opposite directions) by the controller automatically so as to change the arm length of the moment exerted by the gravitational force acting on the weights 618, 620. The controller can also be operable to modulate the resistance exerted by the breaks 630. For steady state travel (e.g., to maintain a particular rotational speed of the outer spherical assembly 622, which can contact the ground), the spherical assembly's 601 controller can automatically and continuously maintain the weights' 618, 620 rotating speeds to be the same as that of the rotating speed of the inner spherical assembly 652.

Figure 7:
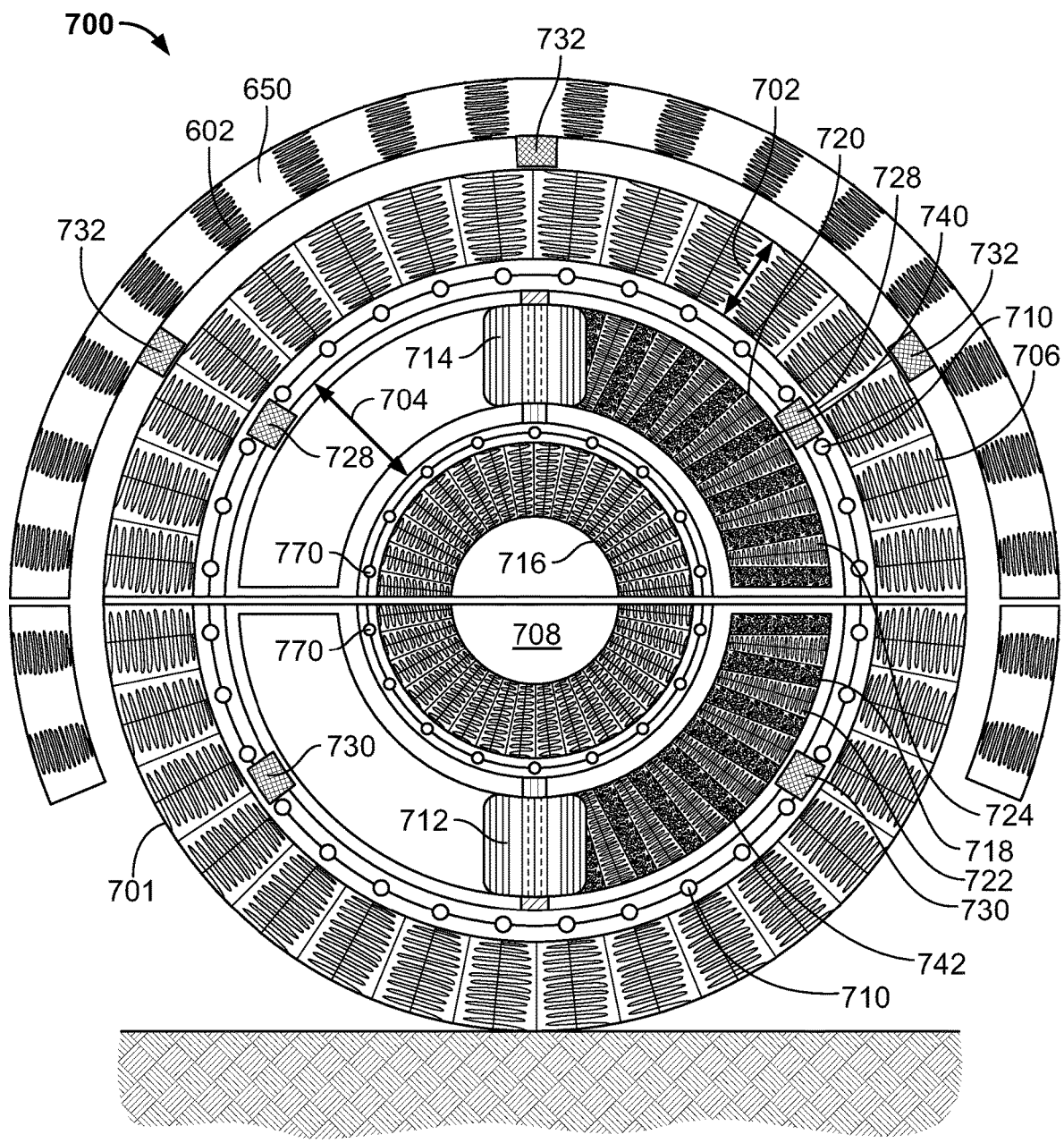
FIG. 7 illustrates an electrified spherical assembly system in accordance with some embodiments of the present disclosure.

FIG. 7 illustrates a spherical assembly system 700 that includes a spherical well 650, and a spherical assembly 701. The spherical assembly 701 includes a spherical inner assembly 704 and a spherical outer assembly 702. Spherical inner assembly 704 houses motor 714 and weight 720 in a first (e.g., upper) portion, and motor 712 and weight 718 in a second (e.g., lower) portion. Each of the first and second portions of spherical inner assembly 704 can be hermetic chambers, for example. Motors 712, 714 can be variable speed direct current (DC) motors, such as variable reversible speed DC motors, or any other suitable motors. Weight 720 includes portions of radial magnetic core 740 and portions of current carrying conductor 724. Weight 718 includes portions of radial magnetic core 742 and portions of current carrying conductor 722. In this example, the weights 718 and 720 are in the shape of a quarter of a hollow sphere, where the respective hollow spheres allow for placement of the radial magnetic cores 740, 742 and current carrying conductors 724, 722.

Spherical assembly 701 can also include a friction reducer configured to minimize friction between the spherical inner assembly 704 and the spherical outer assembly 702. In this example, the friction reducer includes ball bearings 710. The ball bearings 710 may be held in place by a wire mesh or other suitable material. The friction reducer can also include a flow path of oil such that the ball bearings 710 reside in the flow path of oil. The oil can serve as a lubricant as well as a cooling mechanism. Spherical assembly 701 can also include a friction reducer 770 configured to minimize friction between the spherical inner assembly 704 and radial magnetic windings 716.

Spherical inner assembly 704 can also encase radial magnetic windings 716 in each of the first portion and the second portion. Similarly, spherical outer assembly 702 may encase radial magnetic windings 706. These magnetic windings can be, for example, windings of a radial magnetic core. The magnetic windings 706, 716 may be of opposite polarities, thereby creating magnetic fields across the current carrying conductors 722 and 724 embedded within weights 718 and 722.

One or both of the portions of spherical inner assembly 704 can also include one or more controllers (not shown) that are operatively coupled to one or both of motors 712, 714. The controller can be, for example, a processor, a microprocessor, or a microcontroller. The controller may also be implemented as part of or in a field programmable gate array (FPGA), an application specific integrated circuit (ASIC), digital circuitry, or any suitable circuitry. The controller can be configured to cause the motors 712, 714 to rotate weights 718, 720, respectively. The controller can be housed in a respective half of a center region 708 of spherical inner assembly 704. In some examples, the controller is attached to, or is embedded within, a weight 720, 718.

One or both of the first and second portions of center region 708 can house batteries (not shown) to power the center magnetic windings 716, each of the motors 712, 714 and/or the controller. The batteries can be, for example, rechargeable batteries such as wirelessly charged batteries, traditional batteries, gel type batteries, or any other suitable batteries. The batteries can optionally be housed in a respective half of a center region 708 of spherical assembly 701. In some examples, the batteries can be attached to, or be embedded within, one or more weights 720, 718.

The controller can be operatively connected to the current carrying conductors 722, 724, and can be configured to control an amount, timing, and direction of currents through the current carrying conductors 722, 724. In some examples, the controller causes the motors 712, 714 to rotate weights 718, 720, respectively, in opposite directions, and causes a current to go through current carrying conductors 722, 724. As the weights 718, 720 rotate through the magnetic fields provided by radial magnetic windings 706, 716, a magnetic force is applied to the weights 718, 722 due to the current going through the current carrying conductors 722, 724. The magnetic force applied to the weights 718, 722 can act with, or against, the gravitational force acting on weights 718, 722. For example, the controller may cause current to go through the current carrying conductors 722, 724 is one direction such that the magnetic force is in a same direction as the gravitation force acting on the weights 718, 722. As such, the magnetic force will tend to increase the speed of the spherical inner assembly 704. Similarly, the controller may cause current to go through the current carrying conductors 722, 724 is another direction such that the magnetic force is in an opposite direction as the gravitation force acting on the weights 718, 722. In this example, the magnetic force will tend to decrease the speed of the spherical inner assembly 704.

For example, to increase a rotational speed of spherical inner assembly 704, the controller may cause an increase to currents flowing through current carrying conductors 722, 724 when weights 718, 720 coincide in a forward half of spherical assembly 701. To reduce the rotational speed of spherical inner assembly 704, the controller may cause an increase to currents flowing through current carrying conductors 722, 724 when weights 718, 720 coincide in a backward half of spherical assembly 701. To reduce the rotational speed of spherical inner assembly 704, the controller may instead cause a decrease to (e.g., completely eliminate) currents flowing through current carrying conductors 722, 724 when weights 718, 720 coincide in a forward half of spherical assembly 701.

In some examples, rather than causing a current to flow through the current carrying conductors 722, 724, the controller directs current generated in the current carrying conductors 722, 784 to charge batteries, such as batteries power the center magnetic windings 716, each of the motors 712, 714 and/or the controller. For example, as the weights 718, 720 rotate through the magnetic flux created by the radial magnetic windings 706, 716, a current is generated in the current carrying conductors 722, 724. This current can be directed by the controller (via an electrical switch, for example) to charge one or more batteries.

The controller may also be connected to one or more brakes 728, 730, 732. The controller can control and modulate the brakes 728, 730 between spherical inner assembly 704 and the spherical outer assembly 702 to adjust the spherical inner assembly 704 rotating speed. The brakes 732 are located between spherical well 650 and the spherical outer assembly 702.

The controller may also be connected to one or more motion detectors (not shown). The motion detectors can be any suitable, such as one that can indicate absolute or relative rotational speeds. In some examples, the controller is configured to cause a current through the current carrying conductors 722, 724 based on the rotational speed of the spherical inner assembly 704. For example, the controller can detect the rotational speed of the spherical inner assembly 704 via one or more of the motion detectors. Based on the detected rotational speed, the controller may increase, or decrease, the currents flowing through the current carrying conductors 722, 724.

Figure 8:
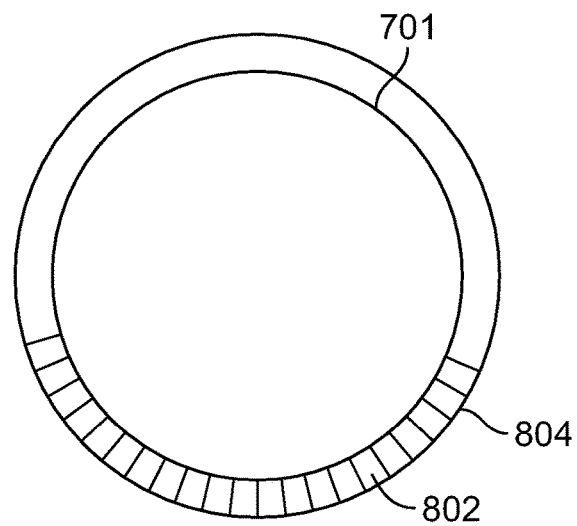
FIG. 8 illustrates the spherical assembly of FIG. 7 that includes an additional outer surface in accordance with some embodiments of the present disclosure.

FIG. 8 illustrates the spherical assembly of FIG. 7 including an outer surface 804. The outer surface 804 encases (e.g., surrounds) spherical assembly 701. The outer surface 804 includes air cooling fins 802 to allow for heat dissipation. For example, the air cooling fins may provide cooling to the friction reducer of FIG. 7. In some examples, the air cooling fins may be covered with a perforated cover. For example, a perforated sheet metal cover with an outside rubber layer may cover the air cooling fins. The outside rubber layer provides a high coefficient of friction when in contact with a roadway, thereby reducing slippage. In some examples, outer surface encases the spherical assembly 601 of FIG. 6.

Figure 9:
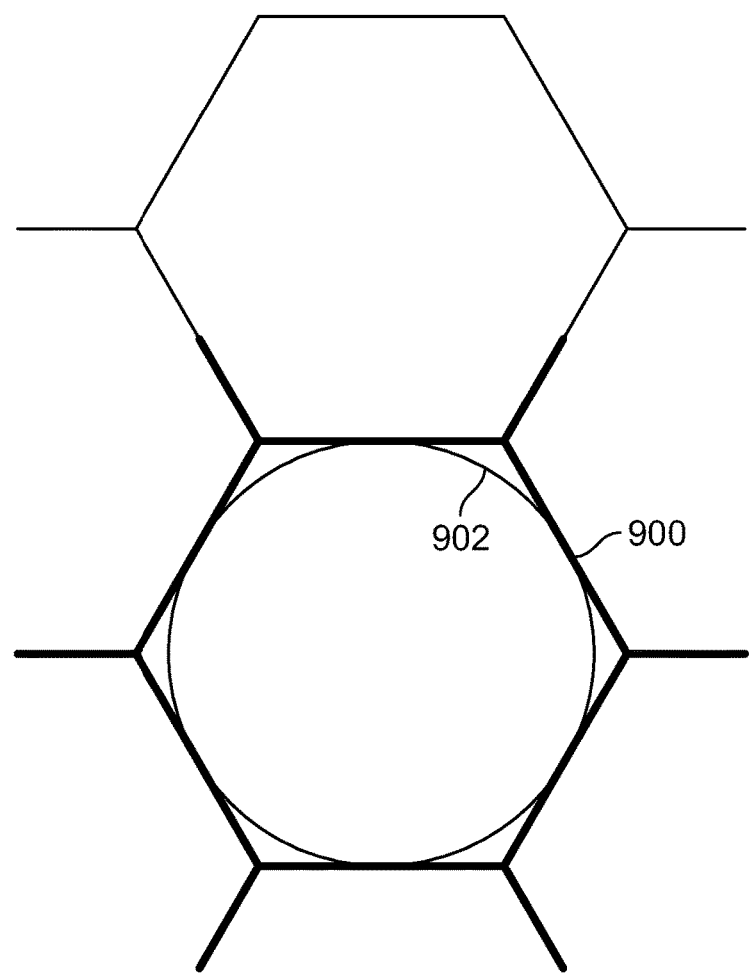
FIG. 9 illustrates a motion detector that can be used with the spherical assembly of FIG. 6 in accordance with some embodiments of the present disclosure.

FIG. 9 shows an example of motion detector 900. For example, motion detector 900 can be employed as motion detectors 634 of FIG. 6, or as a motion detector in FIG. 7. In this example, motion detector 900 is in a hexagon shape and includes a magnetic core and windings 902. The motion detector may be coded for monitoring rotating speeds. For example, motion detector 728, 730 can be configured to detect the rotational speed of the spherical inner assembly 704.

Figure 10A:
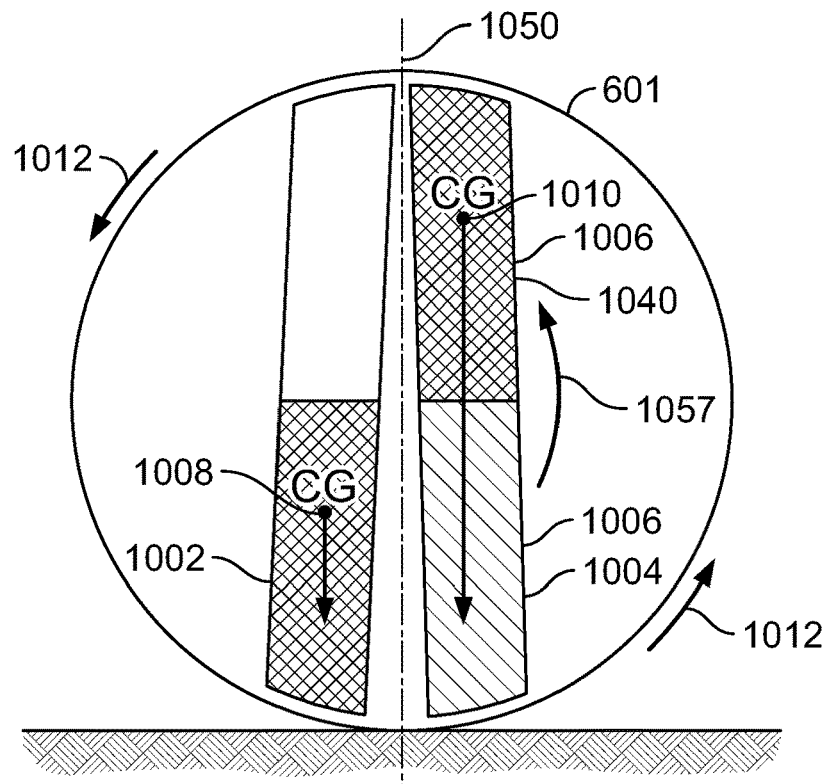
FIGS. 10A and 10B illustrate a weight configuration that may be used with the spherical assemblies of FIGS. 2A-2C, FIG. 6, or FIG. 7 in accordance with some embodiments of the present disclosure.
Figure 10B:
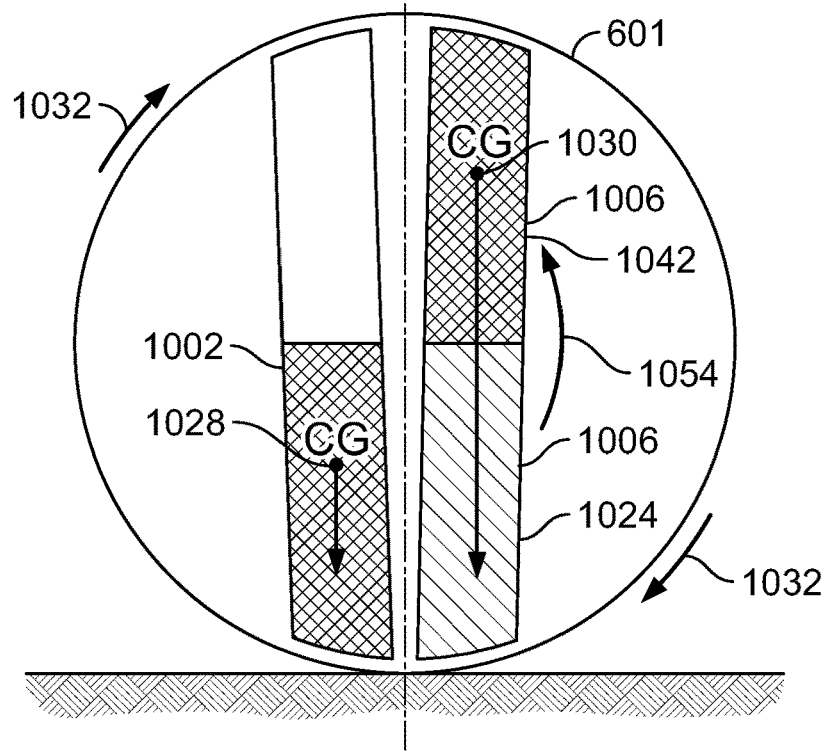

FIGS. 10A and 10B show a weight configuration that may be employed, for example, in spherical assembly 601. In the figures, spherical assembly 601 includes weights 1006, 1002. Each weight 1006, 1002 includes a planar surface that forms a same angle (e.g., an angle greater than 0 degrees) with respect to the center axial line 1050 of spherical assembly 601. In other words, the weights 1006, 1008 include tilted and mirrored planes with respect to the center axial line 1050 of spherical assembly 601. To initiate rotation (e.g., rolling) of spherical assembly 601 along the surface, one or both of weights 1006, 1008 may be rotated such that one or both of the weights, due to gravity, provide a moment to the spherical assembly 601 in a desired direction of travel.

For example, in FIG. 10A, assume spherical assembly 601 is at rest, with weight 1002 in the position shown, and weight 1006 at the position 1004. Weight 1002 would have a center of gravity 1008 with a distance from center axial line 1050, and weight 1006 would have a center of gravity (not shown) located at the same distance from center axial line 1050 (assuming weights 1002, 1006 have same shape and density). At this position, the moment of a gravitational force on weight 1002 with respect to the center axial line 1050 is the same as the moment of a gravitational force on weight 1006 with respect to the same center axial line 1050. Because the moments are in opposite directions (e.g., moment caused by weight 1002 is in counter-clockwise direction while moment caused by weight 1006 is in clockwise direction), spherical assembly 601 does not rotate.

If either weight 1002 or 1006 is rotated, however, the moments acting on spherical assembly 601 change. For example, if weight 1006 is rotated to be at position 1040 as indicated by arrow 1052, the moment of a gravitational force on weight 1002 with respect to center axial line 1050 would be greater than the moment of a gravitational force on weight 1006 with respect to the same center axial line 1050. This is because the center of gravity 1010 of weight 1040 would be at a lesser distance from center axial line 1050 than the center of gravity 1008 of weight 1002 is from the same center axial line 1050. As such, spherical assembly 601 would tend to rotate in the direction identified by arrows 1012 (e.g., counter-clockwise). In this manner, the rotation of spherical assembly 601 may be initiated.

Similarly, in FIG. 10B, assume spherical assembly 601 is at rest, with weight 1002 in the position shown, and weight 1006 at the position 1024. Weight 1002 would have a center of gravity 1028 with a distance from center axial line 1050, and weight 1006 would have a center of gravity 1030 located at the same distance from center axial line 1050 (assuming weights 1002, 1006 have same shape and density). Note, however, that these initial distances are less than the initial distances in FIG. 10A. At this position, the moment of a gravitational force on weight 1002 with respect to the center axial line 1050 is the same as the moment of a gravitational force on weight 1006 with respect to the same center axial line 1050. Because the moments are in opposite directions (e.g., moment caused by weight 1002 is in counter-clockwise direction while moment caused by weight 1006 is in clockwise direction), spherical assembly 601 does not rotate.

If either weight 1002 or 1006 is rotated, however, the moments acting on spherical assembly 601 change. For example, if weight 1006 is rotated to be at position 1042 as indicated by arrow 1054, the moment of a gravitational force on weight 1002 with respect to center axial line 1050 would be less than the moment of a gravitational force on weight 1006 with respect to the same center axial line 1050. This is because the center of gravity 1028 of weight 1008 would be at a lesser distance from center axial line 1050 than the center of gravity 1020 of weight 1002 is from the same center axial line 1050. As such, spherical assembly 601 would tend to rotate in the direction identified by arrows 1032 (e.g., clockwise). In this manner, the rotation of spherical assembly 601 may also be initiated.

In some examples, a controller, such as the controller described with respect to FIG. 7, causes a motor, such as motor 712, 714, to rotate at least one of weights 1002, 1006 to initiate rotations of spherical assembly 601.

FIGS. 11A and 11B illustrate a spherical assembly 1101 as it rolls along a plane at each point after one-eighth of a rotation of the spherical assembly 1101 in two views, namely a side view in FIG. 11A and a front view in FIG. 11B. The figures identify a first weight's center of gravity 1102, and a second weight's center of gravity 1104. Although not illustrated, it is to be understood that each weight is connected to a motor that is operable to receive input from a controller and cause the weight to rotate within spherical assembly 1101. In FIG. 11A, position 1110 represents the beginning of a full rotation of spherical assembly 1101 as it rotates clockwise as indicated by the directional arrow, where position 1130 of FIG. 11B illustrates the beginning of the same rotation, but from a front view (e.g., as the spherical assembly 1101 rotates towards the reader.

Position 1112 shows spherical assembly 1101 after one-eighth of a rotation (and similarly at position 1132 of the front view in FIG. 11B); position 1114 shows spherical assembly 1101 after two-eighths of a rotation (and similarly at position 1134 of the front view in FIG. 11B); position 1116 shows spherical assembly 1101 after three-eighths of a rotation (and similarly at position 1136 of the front view in FIG. 11B); position 1118 shows spherical assembly 1101 after four-eighths of a rotation (and similarly at position 1138 of the front view in FIG. 11B); position 1120 shows spherical assembly 1101 after five-eighths of a rotation (and similarly at position 1140 of the front view in FIG. 11B); position 1122 shows spherical assembly 1101 after six-eighths of a rotation (and similarly at position 1142 of the front view in FIG. 11B); and position 1124 shows spherical assembly 1101 after seven-eighths of a full rotation (and similarly at position 1144 of the front view in FIG. 11B). The front view of FIG. 11B shows the same positions of the spherical assembly 1101 as it rotates as the side view of FIG. 11A, but from a front view.

At each position, in both FIGS. 11A and 11B, arrows near the first weight's center of gravity 1102 and the second weight's center of gravity 1104 indicate the direction of centrifugal forces caused on spherical assembly 1101 by each respective weight. For example, at position 1110 in the side view of FIG. 11A (and, similarly, at position 1130 of the front view in FIG. 11B), centrifugal forces caused by each rotating weight apply equal but opposite forces (assuming the weights are being rotated at similar rotational speeds. At position 1112 (and, similarly, position 1132), the centrifugal forces have vertical components in a same vertical direction, but horizontal components in opposite directions. At position 1114 (and, similarly, position 1134), the centrifugal forces are in the same direction of travel of spherical assembly 1101. At position 1116 (and, similarly, position 1136), the centrifugal forces have components in a same direction, and components in opposite directions. At position 1118 (and, similarly, position 1138), the centrifugal forces are in opposite directions. At position 1120 (and, similarly, position 1140), the centrifugal forces have components in a same direction, and components in opposite directions. At position 1122 (and, similarly, position 1142), the centrifugal forces are in a same direction. Finally, at position 1124 (and, similarly, position 1144), the centrifugal forces have components in a same direction, and components in opposite directions. When one or more centrifugal forces caused by rotation weights are in a direction of travel of spherical assembly 1101, the centrifugal forces may propel spherical assembly in the direction of travel. In some examples, one or more centrifugal forces on spherical assembly 1101 by the rotating weights may cause a change in the direction of travel of spherical assembly 1101. In some examples, a controller is configured to cause a change in a direction of travel of spherical assembly 1101 by changing a rotational speed of a rotating weight.

FIGS. 12A and 12B illustrate a spherical assembly 1201 as it rolls along a plane at each point after one-eighth of a rotation of the spherical assembly 1201 in two views, namely a side view in FIG. 12A and a front view in FIG. 12B. The figures identify a first weight's center of gravity 1206, a second weight's center of gravity 1202, and a third weight's center of gravity 1204. In some examples, the first weight weighs twice as much of each of the second weight and the third weight. In some examples, the first weight rotates within a cavity of spherical assembly 1201 that is between cavities through which the second and third weights rotate through, respectively. Although not illustrated, it is to be understood that each weight is connected to a motor that is operable to receive input from a controller and cause the weight to rotate within spherical assembly 1201. In FIG. 12A, position 1210 represents the beginning of a full rotation of spherical assembly 1201, corresponding to position 1230 of the front view in FIG. 12B.

Position 1212 shows spherical assembly 1201 after one-eighth of a rotation (and similarly at position 1232 of the front view in FIG. 12B); position 1214 shows spherical assembly 1201 after two-eighths of a rotation (and similarly at position 1234 of the front view in FIG. 12B); position 1216 shows spherical assembly 1201 after three-eighths of a rotation (and similarly at position 1236 of the front view in FIG. 12B); position 1218 shows spherical assembly 1201 after four-eighths of a rotation (and similarly at position 1238 of the front view in FIG. 12B); position 1220 shows spherical assembly 1201 after five-eighths of a rotation (and similarly at position 1240 of the front view in FIG. 12B); position 1222 shows spherical assembly 1201 after six-eighths of a rotation (and similarly at position 1242 of the front view in FIG. 12B); and position 1224 shows spherical assembly 1201 after seven-eighths of a full rotation (and similarly at position 1244 of the front view in FIG. 12B). The front view of FIG. 12B shows the same positions of the spherical assembly 1201 as it rotates as the side view of FIG. 12A, but from a front view.

At each position, in both FIGS. 12A and 12B, arrows near the first weight's center of gravity 1206, the second weight's center of gravity 1202, and the third weight's center of gravity 1204 indicate the direction of centrifugal forces caused on spherical assembly 1201 by each respective weight. For example, at position 1210 in the side view of FIG. 12A (and, similarly, at position 1230 of the front view in FIG. 12B), centrifugal forces caused by each rotating weight apply equal but opposite forces (assuming the weights are being rotated at similar rotational speeds. At position 1212 (and, similarly, position 1232), the centrifugal forces have vertical components in a same vertical direction, but horizontal components in opposite directions. At position 1214 (and, similarly, position 1234), the centrifugal forces are in the same direction of travel of spherical assembly 1201. At position 1216 (and, similarly, position 1236), the centrifugal forces have components in a same direction, and components in opposite directions. At position 1218 (and, similarly, position 1238), the centrifugal forces are in opposite directions. At position 1220 (and, similarly, position 1240), the centrifugal forces have components in a same direction, and components in opposite directions. At position 1222 (and, similarly, position 1242), the centrifugal forces are in a same direction. Finally, at position 1224 (and, similarly, position 1244), the centrifugal forces have components in a same direction, and components in opposite directions.

When one or more centrifugal forces caused by rotation weights are in a direction of travel of spherical assembly 1201, the centrifugal forces may propel spherical assembly in the direction of travel. In some examples, one or more centrifugal forces on spherical assembly 1201 by the rotating weights may cause a change in the direction of travel of spherical assembly 1201. In some examples, a controller is configured to cause a change in a direction of travel of spherical assembly 1201 by changing a rotational speed of a rotating weight.

In some examples, a controller rotates the first weight to offset (e.g., eliminate) centrifugal forces caused by rotations of the second weight and third weight. For example, the first weight may be rotated to offset an unintended change of direction of spherical assembly 1201.

Figure 13A:
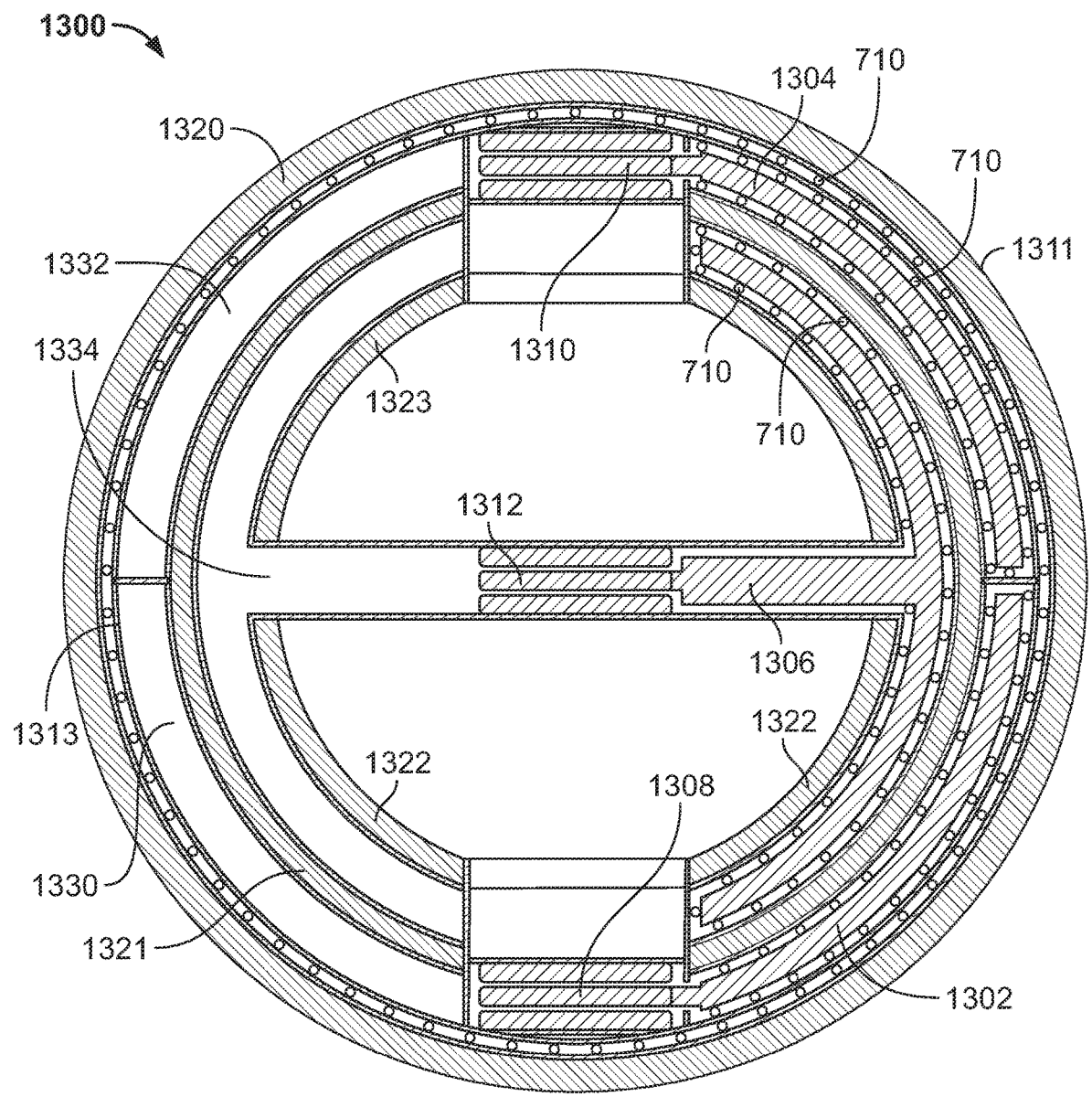
FIGS. 13A, 13B, and 13C illustrate various embodiments of an electrified spherical assembly system with three weights in accordance with some embodiments of the present disclosure.
Figure 13B:
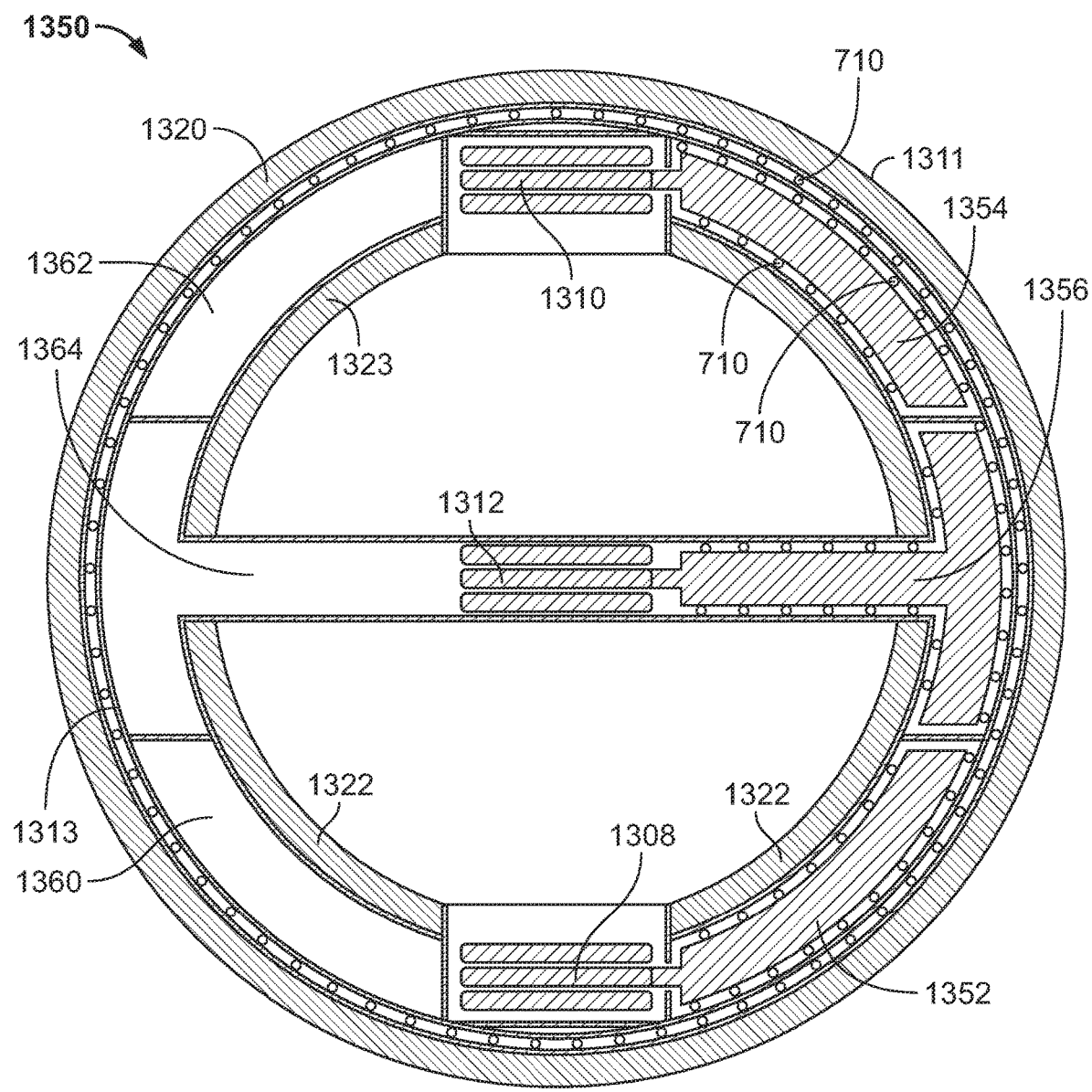
Figure 13C:
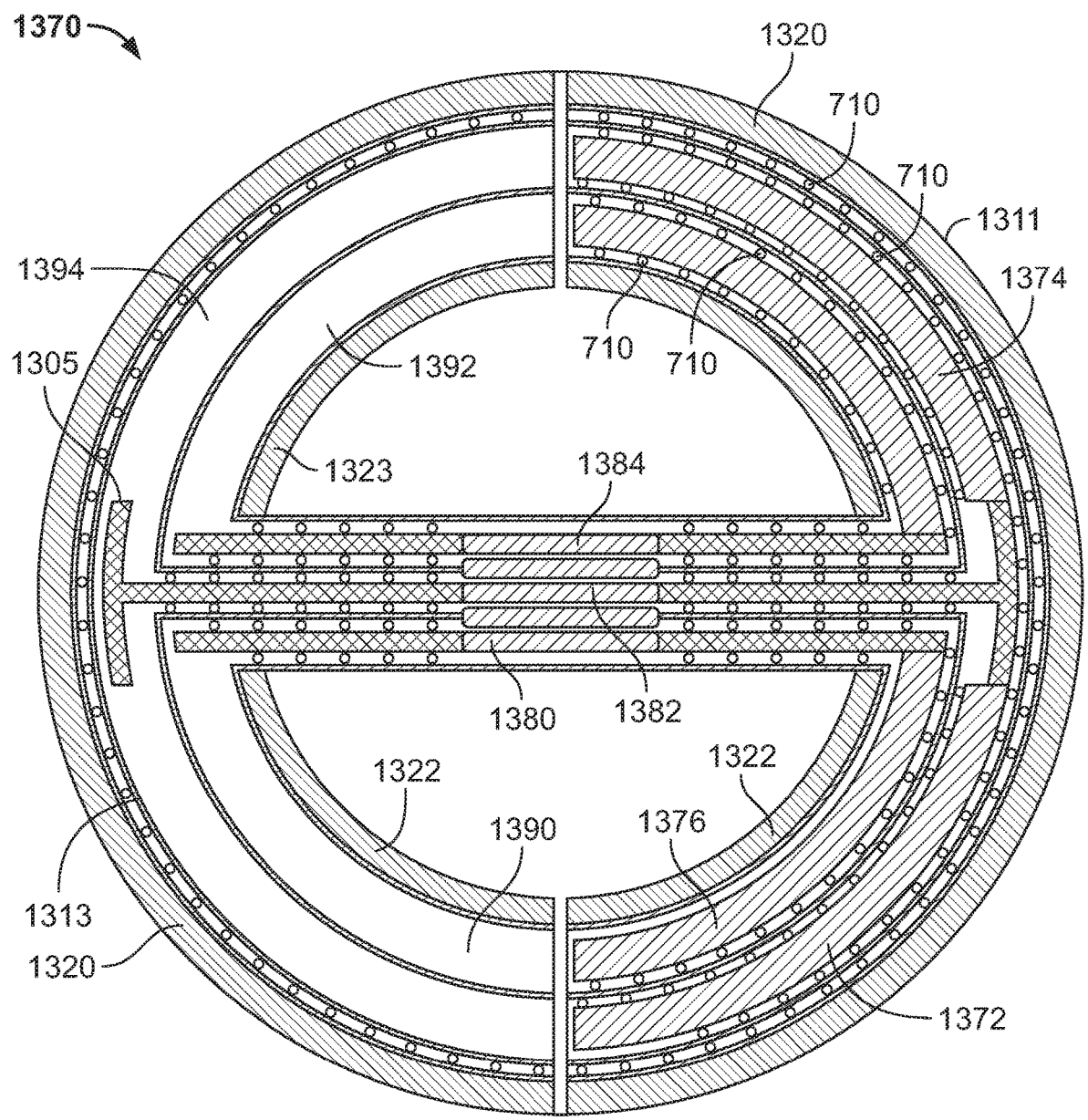

FIGS. 13A, 13B, and 13C illustrate electrified spherical assemblies each with three weights in various configurations. For example, FIG. 13A illustrates spherical assembly 1300 that includes a spherical inner assembly 1313 and a spherical outer assembly 1311. One or more ball bearings 710 and, in some examples, a lubricant, such as oil, separate the spherical inner assembly 1313 from the spherical outer assembly 1311. This allows spherical inner assembly 1313 to rotate within spherical outer assembly 1311 with little to no friction. Spherical inner assembly 1313 houses a first motor 1312 operable to rotate a first weight 1306, a second motor 1308 operable to rotate a second weight 1302, and a third motor 1310 operable to rotate a third weight 1304. First weight 1306 rotates within cavity 1334 of spherical assembly 1300. Second weight 1302 rotates within cavity 1330, and third weight 1304 rotates within cavity 1332, of spherical assembly 1300. In some examples, first weight 1306 weighs twice that of each of second weight 1302 and third weight 1304.

In this example, cavity 1334 is at a radius from the center of spherical assembly 1300 that is less than the radius at which cavities 1330 and 1332 are at. Moreover, while cavity 1334 spans through both a top half and a bottom half of spherical assembly 1300, cavities 1330 and 1332 each span over only one half of spherical assembly 1300.

Spherical assembly 1300 may also include ball bearings 710 and, in some examples, a lubricant, within the cavities of the rotating weights. For example, ball bearings 720 may separate each of first weight 1306, second weight 1302, and third weight 1304 from inner walls of their respective cavities 1334, 1330, 1332. In some examples, permanent magnets 1320, 1321, 1322, 1323, such as rare earth permanent magnets, may be employed to create magnetic fields between the spherical outer assembly 1311 and the spherical inner assembly 1313. Current carrying conductors (not shown) may be embedded within first weight 1306, second weight 1302, and third weight 1304 such that, as the weights rotate, magnetic forces applied to the weights as they rotate through the magnetic fields. These magnetic forces may increase, or decrease, the rotational speeds of the weights. For example, a controller (not shown) can cause the magnetic fields to turn on to increase, or decrease, the rotations speed of any of first weight 1306, second weight 1302, and third weight 1304. In this example, first motor 1312, second motor 1308, and third motor 1310 are aligned along a center horizontal, axis of the spherical assembly 1350, where first motor 1312 is positioned between second motor 1308 and third motor 1310.

FIG. 13B illustrates spherical assembly 1350 similar to the spherical assembly 1300 of FIG. 13A, but with different weight and cavity configurations. For example, spherical assembly 1350 includes a spherical inner assembly 1313 and a spherical outer assembly 1311, one or more ball bearings 710 and, in some examples, a lubricant, such as oil, separate the spherical inner assembly 1313 from the spherical outer assembly 1311. Spherical inner assembly 1313 houses a first motor 1312 operable to rotate a first weight 1356, a second motor 1308 operable to rotate a second weight 1352, and a third motor 1310 operable to rotate a third weight 1354. First weight 1356 rotates within cavity 1364 of spherical assembly 1350. Second weight 1352 rotates within cavity 1360, and third weight 1354 rotates within cavity 1362, of spherical assembly 1350. In some examples, first weight 1356 weighs twice that of each of second weight 1352 and third weight 1354.

In this example, cavity 1364 is at a same radius from the center of spherical assembly 1350 that are cavities 1360 and 1362. In some examples, each of cavities 1364, 1360, and 1362 occupy approximately ⅓ of an internal cavity of spherical assembly 1350. Moreover, cavity 1364 spans partially through both a top half and a bottom half of spherical assembly 1350. Cavity 1362 spans over just a top portion of spherical assembly 1350, and cavity 1360 spans over just a bottom portion of spherical assembly 1350. In this example, first motor 1312, second motor 1308, and third motor 1310 are aligned along a center horizontal axis of the spherical assembly 1350, where first motor 1312 is positioned between second motor 1308 and third motor 1310.

FIG. 13C illustrates spherical assembly 1370 similar to the spherical assembly 1300 of FIG. 13A, but with different weight and cavity configurations. For example, spherical assembly 1350 includes a spherical inner assembly 1313 and a spherical outer assembly 1311. One or more ball bearings 710 and, in some examples, a lubricant, such as oil, separate the spherical inner assembly 1313 from the spherical outer assembly 1311. Spherical inner assembly 1313 houses a first motor 1382 operable to rotate a first weight 1372, a second motor 1380 operable to rotate a second weight 1376, and a third motor 1384 operable to rotate a third weight 1374. In this example, the first motor 1382, the second motor 1380, and the third motor 1384 are located near a center of spherical assembly 1370.

First weight 1372 rotates within cavity 1394 of spherical assembly 1370. Second weight 1376 rotates within cavity 1390, and third weight 1374 rotates within cavity 1392, of spherical assembly 1370. In this example, however, cavity 1334 is at radius from the center of spherical assembly 1370 that is more than the radius at which cavities 1330 and 1332 are at. In some examples, first weight 1372 weighs twice that of each of second weight 1376 and third weight 1374. In some examples, first motor 1382 may also rotate a counter weight 1305, which may assist in stabilizing spherical assembly 1370 during rotation.

Figure 14A:
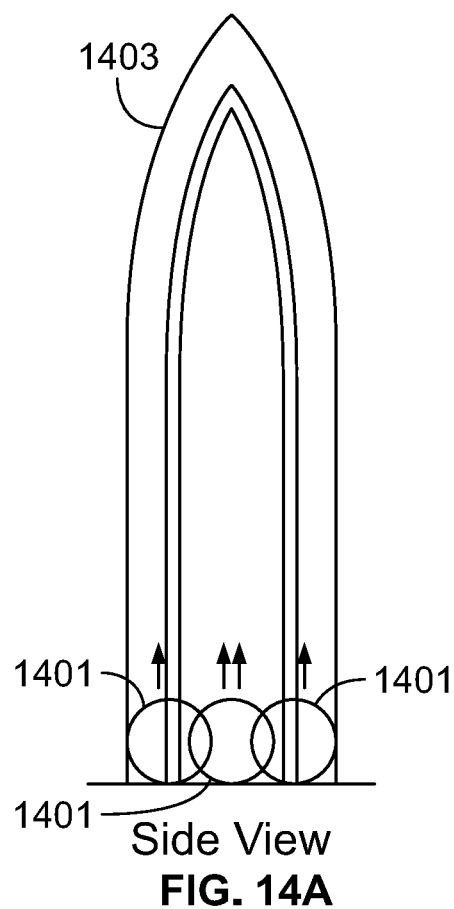
FIGS. 14A and 14B illustrate various views of multiple spherical assemblies as employed in a rocket in accordance with some embodiments of the present disclosure
Figure 14B:
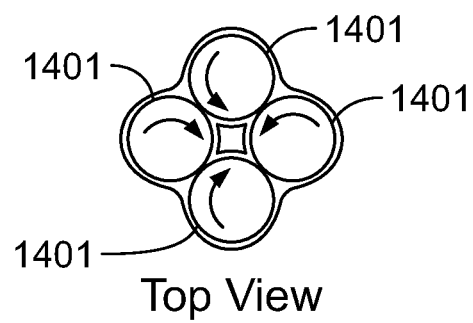

FIG. 14A illustrates a rocket 1403 employing a plurality of spherical assemblies 1401. Spherical assembly 1401 may include one or more of the spherical assemblies of FIGS. 13A-13C, for example. As illustrated by directional arrows, spherical assemblies may cause a propulsion force in a vertical direction. FIG. 14B illustrates a top view of the spherical assemblies 1401 of FIG. 14A. The spherical assemblies 1401 may rotate in opposite directions to cancel or minimize horizontal forces, while maximizing a vertical force.

Figure 14C:
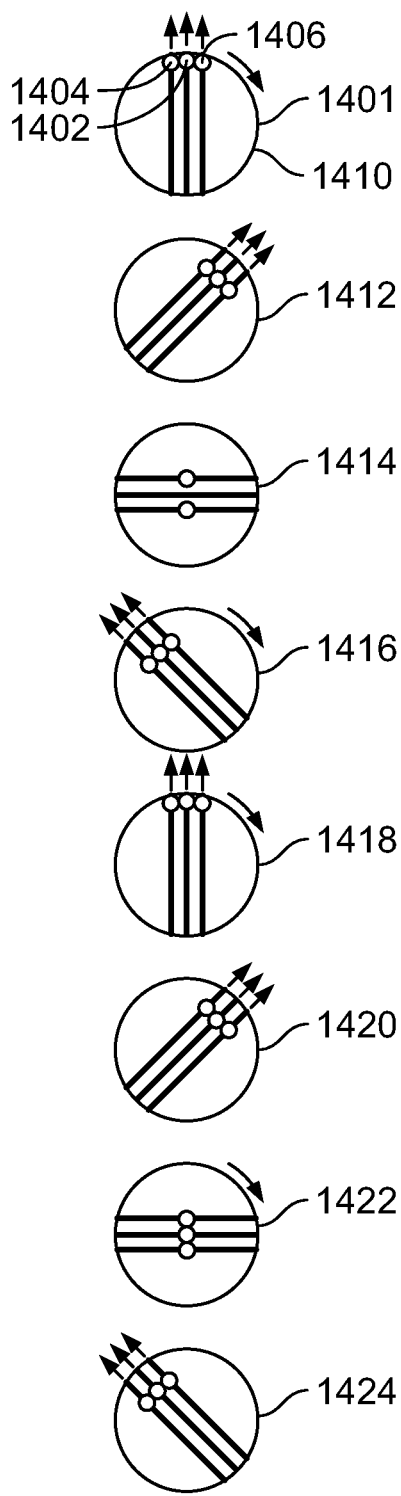
Figure 14D:
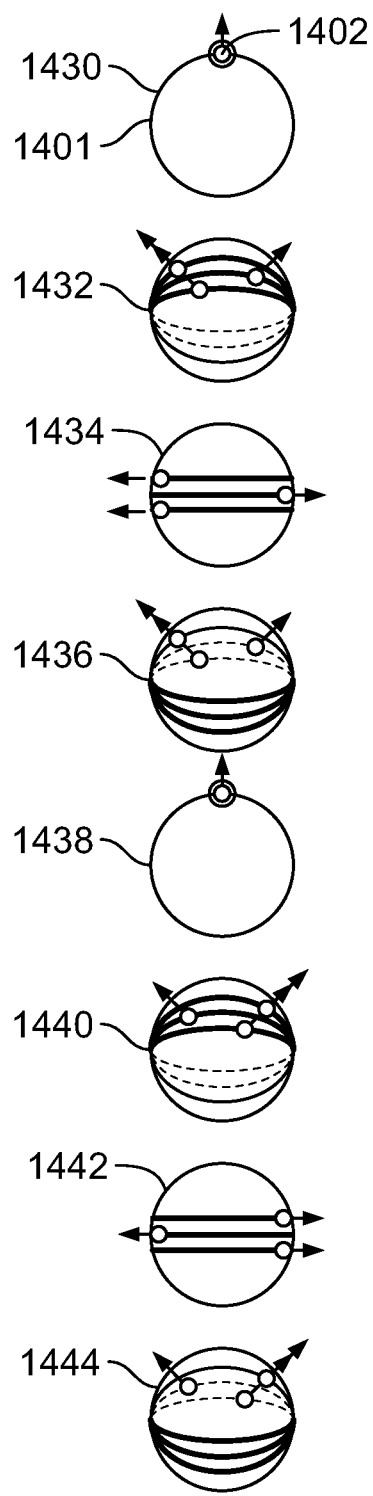

FIGS. 14C and 14D illustrate a spherical assembly 1401 as it rolls along a plane at each point after one-eighth of a rotation of the spherical assembly 1401 in two views, namely a side view in FIG. 14C and a front view in FIG. 14D. The figures identify a first weight's center of gravity 1406, a second weight's center of gravity 1402, and a third weight's center of gravity 1404. In some examples, the first weight weighs twice as much of each of the second weight and the third weight. In some examples, the first weight rotates within a cavity of spherical assembly 1401 that is between cavities through which the second and third weights rotate through, respectively. Although not illustrated, it is to be understood that each weight is connected to a motor that is operable to receive input from a controller and cause the weight to rotate within spherical assembly 1401. In FIG. 14C, position 1410 represents the beginning of a full rotation of spherical assembly 1401 rotating in a direction as illustrated by the directional arrow, which corresponds to position 1430 of the front view in FIG. 14D.

Position 1412 shows spherical assembly 1401 after one-eighth of a rotation (and similarly at position 1432 of the front view in FIG. 14D); position 1414 shows spherical assembly 1401 after two-eighths of a rotation (and similarly at position 1434 of the front view in FIG. 14D); position 1416 shows spherical assembly 1401 after three-eighths of a rotation (and similarly at position 1436 of the front view in FIG. 14D); position 1418 shows spherical assembly 1401 after four-eighths of a rotation (and similarly at position 1438 of the front view in FIG. 14D); position 1420 shows spherical assembly 1401 after five-eighths of a rotation (and similarly at position 1440 of the front view in FIG. 14D); position 1422 shows spherical assembly 1401 after sixth-eighths of a rotation (and similarly at position 1442 of the front view in FIG. 14D); and position 1424 shows spherical assembly 1401 after seven-eighths of a rotation (and similarly at position 1444 of the front view in FIG. 14D). The front view of FIG. 14D shows the same positions of the spherical assembly 1401 as it rotates as the side view of FIG. 14C, but from a front view.

At each position, in both FIGS. 14C and 14D, arrows near the first weight's center of gravity 1406, the second weight's center of gravity 1402, and the third weight's center of gravity 1404 indicate the direction of centrifugal forces caused on spherical assembly 1401 by each respective weight. For example, at position 1410 in the side view of FIG. 14C (and, similarly, at position 1430 of the front view in FIG. 14D), centrifugal forces caused by each rotating weight apply in a same direction (e.g., upwards), with the assumption that the weights are being rotated at similar rotational speeds. At position 1412 (and, similarly, position 1432), the centrifugal forces have vertical components in a same vertical direction, but horizontal components in opposite directions. At position 1414 (and, similarly, position 1434), the centrifugal forces are in opposite directions. For example, the centrifugal force caused by the rotation of the first weight is opposite to the centrifugal forces caused by rotation of the second and third weights. At position 1416 (and, similarly, position 1436), the centrifugal forces have components in a same direction (e.g., vertically), and components in opposite directions. At position 1418 (and, similarly, position 1438), the centrifugal forces are in the same direction. At position 1420 (and, similarly, position 1440), the centrifugal forces have components in a same direction (e.g., vertically), and components in opposite directions. At position 1422 (and, similarly, position 1442), the centrifugal forces are in opposite directions. For example, the centrifugal force caused by the rotation of the first weight is opposite to the centrifugal forces caused by rotation of the second and third weights. Finally, at position 1424 (and, similarly, position 1444), the centrifugal forces have components in a same direction (e.g., vertically), and components in opposite directions.

FIGS. 14E and 14F illustrate another spherical assembly 1401 as it rolls along a plane at each point after one-eighth of a rotation of the spherical assembly 1401 in two views, namely a front view in FIG. 14E and a side view in FIG. 14F. FIG. 14F is similar to FIG. 14C except that, as indicated by the direction arrow at position 1480, the spherical assembly 1401 is rotating in an opposite direction (e.g., counter-clockwise instead of clockwise). By including spherical assemblies 1401 that rotate in opposite directions, vibrational forces created by rotating weights may be balanced (e.g., offset).

In FIG. 14F, position 1480 represents the beginning of a full rotation of spherical assembly 1401 rotating in a direction as illustrated by the directional arrow, which corresponds to position 1460 of the front view in FIG. 14E. Position 1482 shows spherical assembly 1401 after one-eighth of a rotation (and similarly at position 1462 of the front view in FIG. 14E); position 1484 shows spherical assembly 1401 after two-eighths of a rotation (and similarly at position 1464 of the front view in FIG. 14E); position 1486 shows spherical assembly 1401 after three-eighths of a rotation (and similarly at position 1466 of the front view in FIG. 14E); position 1488 shows spherical assembly 1401 after four-eighths of a rotation (and similarly at position 1468 of the front view in FIG. 14E); position 1490 shows spherical assembly 1401 after five-eighths of a rotation (and similarly at position 1470 of the front view in FIG. 14E); position 1492 shows spherical assembly 1401 after six-eighths of a rotation (and similarly at position 1472 of the front view in FIG. 14E); and position 1494 shows spherical assembly 1401 after seven-eighths of a rotation (and similarly at position 1474 of the front view in FIG. 14E). The front view of FIG. 14E shows the same positions of the spherical assembly 1401 as it rotates as the side view of FIG. 14F, but from a front view.

At each position, in both FIGS. 14E and 14F, arrows near the first weight's center of gravity 1452, the second weight's center of gravity 1454, and the third weight's center of gravity 1456 indicate the direction of centrifugal forces caused on spherical assembly 1401 by each respective weight. For example, at position 1480 in the side view of FIG. 14F (and, similarly, at position 1460 of the front view in FIG. 14E), centrifugal forces caused by each rotating weight apply in a same direction (e.g., upwards), with the assumption that the weights are being rotated at similar rotational speeds. At position 1482 (and, similarly, position 1462), the centrifugal forces have vertical components in a same vertical direction, but horizontal components in opposite directions. At position 1484 (and, similarly, position 1464), the centrifugal forces are in opposite directions. For example, the centrifugal force caused by the rotation of the first weight is opposite to the centrifugal forces caused by rotation of the second and third weights. At position 1466 (and, similarly, position 1486), the centrifugal forces have components in a same direction (e.g., vertically), and components in opposite directions. At position 1488 (and, similarly, position 1468), the centrifugal forces are in the same direction (e.g., vertically up). At position 1490 (and, similarly, position 1470), the centrifugal forces have components in a same direction (e.g., vertically), and components in opposite directions. At position 1492 (and, similarly, position 1472), the centrifugal forces are in opposite directions. For example, the centrifugal force caused by the rotation of the first weight is opposite to the centrifugal forces caused by rotation of the second and third weights. Finally, at position 1474 (and, similarly, position 1494), the centrifugal forces have components in a same direction (e.g., vertically), and components in opposite directions.

Figure 15:
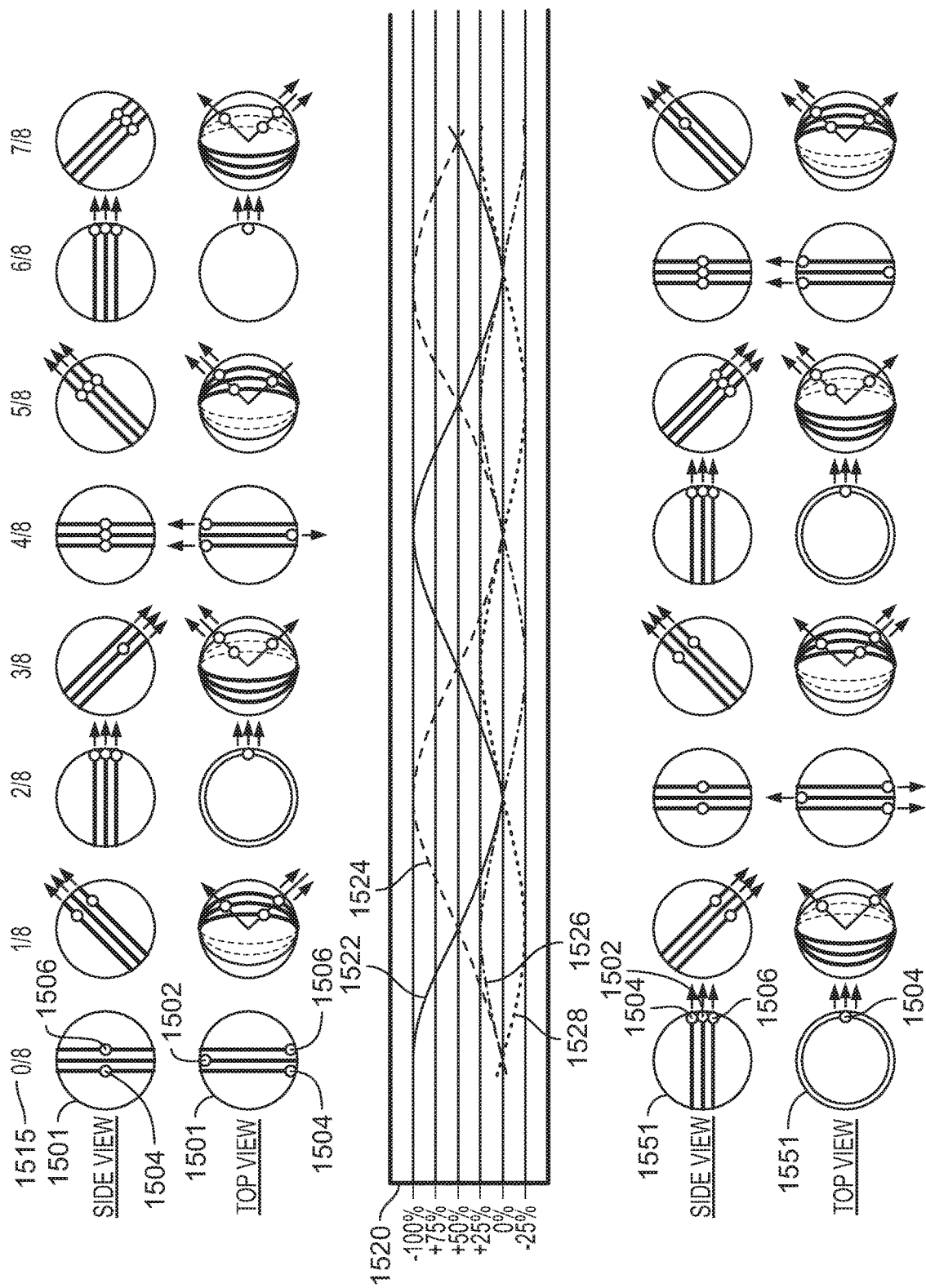
FIG. 15 illustrates centrifugal forces acting on spherical assemblies in accordance with some embodiments of the present disclosure.

FIG. 15 illustrates centrifugal forces acting on spherical assemblies 1501 and 1551. Spherical assemblies 1501 and 1551 may be, for example, spherical assembly 1401, each with outer assembly encasings rotating in opposite directions. For each spherical assembly 1501 and 1551, FIG. 15 illustrates a side view, and a top view, as the respective spherical assembly rotates along a plane at each point after one-eighth of a rotation as indicated by positions 1515. In this example, a controller (not shown) causes motors (not shown) to rotate a first weight, a second weight, and a third weight, to cancel unbalanced vibrations due to created centrifugal forces caused by, for example, the rotating weights. FIG. 15 identifies the first weight's center of gravity 1502, the second weights center of gravity 1504, and the third weight's center of gravity 1506.

Graph 1520 illustrates respective magnitudes (in percentages) of centrifugal forces experienced by the respective spherical assemblies 1501 and 1551 over a full rotation. Graph 1520 identifies four plots, namely, plot 1522, plot 1524, plot 1526, and plot 1528. Plot 1524 and plot 1526 correspond to spherical assembly 1501, and plot 1522 and plot 1528 correspond to spherical assembly 1551. Plots 1526 and 1528 indicate respective magnitudes of centrifugal forces experienced by the respective spherical assemblies 1501, 1551 in a direction perpendicular to both their travel of direction and their axis of rotation (e.g., up or down from the plane on which they rotate). Plots 1522 and 1524 indicate respective magnitudes of centrifugal forces experienced by the respective spherical assemblies 1551, 1501 in their direction of travel.

Thus, for example, after two-eighths of a rotation, plot 1524 indicates that close to 100% of the centrifugal forces experienced by spherical assembly 1501 are along its direction of travel, while spherical assembly 1551 experiences little if any centrifugal force, as indicated by plot 1522. However, after four-eighths of a rotation, plot 1524 indicates that spherical assembly 1501 experiences little if any centrifugal force, while close to 100% of the centrifugal forces experienced by spherical assembly 1551 are along its direction of travel, as indicated by plot 1522.

Plot 1526 indicates that spherical assembly 1501 experiences the largest percentage of centrifugal forces in a direction perpendicular to the direction of travel after one-eighths and five-eighths of a rotation. This is because the centrifugal forces due to the rotating weights have components in a vertical direction. Plot 1528 indicates that spherical assembly 1551 experiences the largest percentage of centrifugal forces perpendicular to the direction of travel after three-eighths and seven-eighths of a rotation.

Among other advantages, the apparatus and methods can provide for propulsion without the need for a combustion engine or a gearbox. In addition, the apparatus can inherently change its direction of travel to any direction without requiring a large turning radius. The apparatus and methods may provide for propulsion of any suitable vehicle, such as a land or amphibious vehicle. For example, the apparatus and methods may improve road traction control and reduce road slippage. The apparatus and methods may also reduce vehicle stop distance. In addition, the apparatus may require less components over traditional combustion engines, and can provide cost benefits as well. Other advantages of these disclosures will be readily apparent to one skilled in the art to whom the disclosures are provided from a perusal of the claims, the appended drawings, and the following detail description of the embodiments.

While preferred embodiments of the present subject matter have been described, it is to be understood that the embodiments described are illustrative only and that the scope of the subject matter is to be defined solely by the appended claims when accorded a full range of equivalence, and the many variations and modifications naturally occurring to those of skill in the art from a perusal hereof.

I claim:

1. A spherical assembly comprising:
   a spherical encasing;
   a first motor connected to a first weight and the spherical encasing;
   a second motor connected to a second weight and the spherical encasing;
   a third motor connected to a third weight and the spherical encasing; and
   a controller, operatively coupled to the first motor, the second motor, and the third motor, and configured to:
   cause the first motor to rotate the first weight in a first direction at a first rotational speed based on a rotational speed of the spherical assembly;
   cause the second motor to rotate the second weight in a second direction at a second rotational speed based on the rotational speed of the spherical assembly; and
   cause the third motor to rotate the third weight in the second direction at the second rotational speed;
   cause the first motor to change the first rotational speed of the first weight in relation to the second rotational speed of the second weight and the third weight to change a direction of travel of the spherical assembly.

2. The spherical assembly of claim 1 wherein the first weight weighs approximately twice of each of the second weight and the third weight.

3. The spherical assembly of claim 2 wherein the controller is configured to rotate the first weight to offset a centrifugal force on the spherical assembly caused by the rotation of at least the second weight and the third weight.

4. The spherical assembly of claim 1 wherein the controller is configured to cause the first rotational speed of the first motor and the second rotational speed of the second motor and the third motor to be the rotational speed of the spherical assembly.

5. The spherical assembly of claim 1 wherein the controller is configured to cause the first motor to rotate the first weight such that the first weight provides a greatest moment of a gravitational force to a point along a center axial line of the spherical assembly.

6. The spherical assembly of claim 5 wherein the controller is configured to cause the second motor to rotate the second weight such that the second weight provides a greatest moment of a gravitational force to the point along the center axial line of the spherical assembly simultaneous to when the controller causes the first motor to rotate the first weight to provide the greatest moment of the gravitational force to the center axial line of the spherical assembly.

7. The spherical assembly of claim 1 wherein the controller is configured to cause:
the first motor to change the rotational first speed of the first weight to the rotational speed of the spherical assembly; and
the second motor to change the second rotational speed of the second weight to the rotational speed of the spherical assembly.

8. The spherical assembly of claim 1 wherein the controller is configured to cause the first motor and the second motor to rotate the first weight and the second weight such that a center of gravity of the first weight and a center of gravity of the second weight are maintained in a half of the spherical encasing.

9. The spherical assembly of claim 1 wherein at least one of the first weight and the second weight is coupled to current conductors, wherein the controller is configured to cause a current through the current conductors based on the rotational speed of the spherical assembly.

10. A spherical assembly comprising:
a spherical inner assembly encasing:
a first motor connected to a first weight;
a second motor connected to a second weight; and
a controller, operatively coupled to the first motor and to the second motor, and configured to:
cause the first motor to rotate the first weight in a first direction at a first rotational speed based on a rotational speed of the spherical inner assembly;
cause the second motor to rotate the second weight in a second direction at a second rotational speed based on the rotational speed of the spherical inner assembly; and
cause the first rotational speed of the first motor to change in relation to the second rotational speed of the second motor to change a direction of travel of the spherical assembly; and
a spherical outer assembly encasing:
the spherical inner assembly; and
a friction reducer configured to minimize friction between the spherical inner assembly and the spherical outer assembly.

11. The spherical assembly of claim 10 further comprising first magnetic windings partially affixed to the spherical outer assembly and second magnetic windings partially affixed to the spherical inner assembly.

12. The spherical assembly of claim 11 wherein a polarity of the first magnetic windings is opposite to a polarity of the second magnetic windings, and wherein at least one of the first weight and the second weight is coupled to magnetic cores and current carrying conductors.

13. The spherical assembly of claim 10 wherein the friction reducer comprises at least one ball bearing.

14. The spherical assembly of claim 10 wherein the first weight weights at least twice of each of the second weight and the third weight.

15. The spherical assembly of claim 10 further comprising at least one motion detector in communication with the controller and configured to detect the rotational speed of the spherical inner assembly.

16. The spherical assembly of claim 10 further comprising a third motor, wherein the controller is configured to rotate the third weight in the second direction at the second rotational speed.

17. A method to propel a spherical assembly comprising:
causing a first motor to rotate a first weight in a first direction at a first rotational speed based on a rotational speed of the spherical assembly;
causing a second motor to rotate a second weight in a second direction at a second rotational speed based on the rotational speed of the spherical assembly; and
causing the first rotational speed of the first motor to change in relation to the second rotational speed of the second motor to change a direction of travel of the spherical assembly.

18. The method of claim 17 further comprising causing the first rotational speed of the first motor and the second rotational speed of the second motor to be at the rotational speed of the spherical assembly.

19. The method of claim 17 further comprising:
causing the first motor to rotate the first weight to offset a centrifugal force on the spherical assembly caused by the rotation of at least the second weight and the third weight.

20. The method of claim 17 further comprising causing a third motor to rotate a third weight in the second direction at the second rotational speed.

* * * * *